United States Patent
Innes et al.

(10) Patent No.: US 10,864,640 B1
(45) Date of Patent: *Dec. 15, 2020

(54) ARTICULATING ARM PROGRAMMABLE TANK CLEANING NOZZLE

(71) Applicant: AGI Engineering, Inc., Stockton, CA (US)

(72) Inventors: Alexander G. Innes, Lodi, CA (US); Shon S. Simon, El Dorado Hills, CA (US)

(73) Assignee: AGI Engineering, INC., Stockton, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 15/854,424

(22) Filed: Dec. 26, 2017

(51) Int. Cl.
*B05B 13/04* (2006.01)
*B25J 11/00* (2006.01)
(Continued)

(52) U.S. Cl.
CPC ......... *B25J 11/0085* (2013.01); *B08B 9/0933* (2013.01); *B08B 9/46* (2013.01);
(Continued)

(58) Field of Classification Search
USPC .......................................... 134/18; 239/722
See application file for complete search history.

(56) References Cited

U.S. PATENT DOCUMENTS

| | | |
|---|---|---|
| 1,611,326 A | 12/1926 | Abbe |
| 2,461,433 A | 2/1949 | Moulton |

(Continued)

FOREIGN PATENT DOCUMENTS

| | | |
|---|---|---|
| EP | 1166903 A2 | 1/2002 |
| EP | 3151246 A1 | 4/2017 |

(Continued)

OTHER PUBLICATIONS

NPL Tripod dated , May 2013.*

(Continued)

*Primary Examiner* — Masud Ahmed
(74) *Attorney, Agent, or Firm* — Brian S. Steinberger; Hilary F. Steinberger; Law Office of Brian S. Steinberger, P.A.

(57) ABSTRACT

Manual, automated, or semi-automated articulating arm programmable tank cleaning nozzle systems, devices and methods for providing safe and efficient methods for removing paint, rust, scale, debris, and contaminants as well as methods to apply new coatings to tanks. A hydraulically controlled articulating arm can have up to 11 or more degrees of freedom and a working envelope ranging from approximately 10'×approximately 10'×approximately 10' up to approximately 50'×approximately 50'×approximately 50'. Modularity and light weight components allow quick setup with minimal manpower, and therefore, make relocation in confined tanks feasible. Simplified programming with scanning methods can aide in quick generation of toolpaths. Dust free blasting techniques can be employed, making the operation safer, cleaner, and more efficient. Surface coatings can be applied with the same device further increasing efficiencies. The systems, devices and methods can work in the presence of flammable vapors and dust.

20 Claims, 22 Drawing Sheets

(51) Int. Cl.
*B25J 9/00* (2006.01)
*B25J 9/10* (2006.01)
*B25J 9/14* (2006.01)
*B08B 9/093* (2006.01)
*B08B 9/46* (2006.01)
*B63B 57/00* (2006.01)

(52) U.S. Cl.
CPC ............ *B25J 9/0015* (2013.01); *B25J 9/103* (2013.01); *B25J 9/106* (2013.01); *B25J 9/1035* (2013.01); *B25J 9/144* (2013.01); *B63B 2057/005* (2013.01)

(56) References Cited

U.S. PATENT DOCUMENTS

| | | | |
|---|---|---|---|
| 2,611,523 A | 9/1952 | Aines | |
| 2,668,625 A | 2/1954 | Garland | |
| 2,669,941 A | 2/1954 | Stafford | |
| 2,682,886 A | 7/1954 | Paxton | |
| 2,761,297 A | 9/1956 | Buchsteiner | |
| 2,819,803 A | 1/1958 | Obenchain | |
| 2,833,422 A | 5/1958 | Ferwerda | |
| 2,985,192 A | 5/1961 | Taylor | |
| 2,999,600 A | 9/1961 | Gates | |
| 3,060,972 A | 10/1962 | Sheldon | |
| 3,095,044 A | 6/1963 | Medlock | |
| 3,116,021 A | 12/1963 | Born | |
| 3,155,048 A | 11/1964 | Mandelbaum | |
| 3,161,490 A | 12/1964 | Dudek | |
| 3,162,214 A | 12/1964 | Bazinet, Jr. | |
| 3,190,286 A | 6/1965 | Stokes | |
| 3,266,059 A | 8/1966 | Stelle | |
| 3,274,850 A | 9/1966 | Tascio | |
| 3,305,220 A | 2/1967 | Nevulis | |
| 3,469,712 A | 9/1969 | Arthur | |
| 3,497,083 A | 2/1970 | Anderson | |
| 3,580,099 A | 5/1971 | Mosher | |
| 3,599,871 A | 8/1971 | Ruppel | |
| 3,757,697 A | 9/1973 | Phinney | |
| 3,788,338 A | 1/1974 | Burns | |
| 3,845,596 A | 11/1974 | Veenstra | |
| 3,863,844 A | 2/1975 | McMillan | |
| 3,889,818 A | 6/1975 | Wennerstrom | |
| 3,932,065 A | 1/1976 | Ginsberg et al. | |
| 3,951,572 A | 4/1976 | Ray, Jr. et al. | |
| 4,106,671 A | 8/1978 | Sharples | |
| 4,132,041 A | 1/1979 | Van den Broek | |
| 4,156,331 A | 5/1979 | Lester et al. | |
| 4,250,933 A | 2/1981 | Olson | |
| 4,339,232 A | 7/1982 | Campbell | |
| 4,396,093 A | 8/1983 | Zimmerman | |
| 4,396,728 A | 8/1983 | Faler | |
| 4,415,297 A | 11/1983 | Boring | |
| 4,494,417 A | 1/1985 | Larson et al. | |
| 4,540,869 A | 9/1985 | Yasuoka | |
| 4,630,741 A | 12/1986 | Stevens | |
| 4,661,039 A | 4/1987 | Brenholt | |
| 4,685,349 A | 8/1987 | Wada et al. | |
| 4,817,653 A | 4/1989 | Krajicek et al. | |
| 4,828,461 A | 5/1989 | Laempe | |
| 4,848,179 A | 7/1989 | Ubhayakar | |
| 4,944,535 A | 7/1990 | Maupin | |
| 4,945,955 A | 8/1990 | Murphy | |
| 4,977,790 A | 12/1990 | Nishi et al. | |
| 5,007,803 A | 4/1991 | DiVito et al. | |
| D326,336 S | 5/1992 | Christ | |
| 5,172,710 A | 12/1992 | Harrington | |
| 5,174,168 A | 12/1992 | Takagi et al. | |
| 5,297,443 A | 3/1994 | Wentz | |
| 5,439,020 A | 8/1995 | Lockhart | |
| 5,451,135 A | 9/1995 | Schempf et al. | |
| 5,515,654 A | 5/1996 | Anderson | |
| 5,518,553 A * | 5/1996 | Moulder | B08B 9/0936 134/167 R |
| 5,540,172 A | 7/1996 | Goldbach et al. | |
| 5,607,000 A | 3/1997 | Cripe et al. | |
| 5,715,852 A | 2/1998 | Jepsen | |
| 5,740,821 A * | 4/1998 | Arnold | B08B 9/093 134/113 |
| 5,913,320 A | 6/1999 | Varrin, Jr. et al. | |
| 6,213,134 B1 * | 4/2001 | Pike | B08B 9/093 134/166 R |
| 6,213,135 B1 | 4/2001 | Moulder | |
| 6,264,434 B1 | 7/2001 | Frank | |
| 6,273,790 B1 | 8/2001 | Neese et al. | |
| 6,280,408 B1 | 8/2001 | Sipin | |
| 6,561,368 B1 | 5/2003 | Sturm, Jr. et al. | |
| 6,651,837 B2 | 11/2003 | Stradinger et al. | |
| 6,830,079 B1 * | 12/2004 | Ahrens | B22D 31/005 141/51 |
| 6,889,920 B2 | 5/2005 | Nance et al. | |
| 6,938,691 B2 | 9/2005 | Face | |
| 7,021,675 B2 | 4/2006 | Lawson | |
| 7,032,628 B2 | 4/2006 | Guillemette et al. | |
| 7,100,631 B2 | 9/2006 | Liu et al. | |
| 7,241,080 B2 | 7/2007 | Klobucar et al. | |
| 7,261,109 B2 * | 8/2007 | Luke | B08B 3/024 134/22.1 |
| 7,708,504 B2 | 5/2010 | Heckendorn et al. | |
| 7,998,251 B2 | 8/2011 | Pondelick et al. | |
| 8,069,747 B2 | 12/2011 | Buckingham et al. | |
| 8,205,522 B2 | 6/2012 | Buckingham et al. | |
| 8,347,563 B2 | 1/2013 | Anderson | |
| 8,414,246 B2 | 4/2013 | Tobey | |
| 8,702,399 B2 | 4/2014 | Krohn | |
| 8,727,671 B2 | 5/2014 | Sundholm | |
| 8,763,855 B1 | 7/2014 | Harvey et al. | |
| 8,840,087 B2 | 9/2014 | Guyard | |
| 9,195,238 B2 | 11/2015 | Roden et al. | |
| 9,468,957 B1 * | 10/2016 | Al Shammari | B08B 9/087 |
| 10,280,063 B2 | 5/2019 | Innes et al. | |
| 10,406,571 B2 * | 9/2019 | Innes | B08B 9/093 |
| 2002/0002426 A1 | 1/2002 | Burkhard | |
| 2005/0025573 A1 | 2/2005 | Waldman et al. | |
| 2005/0109376 A1 | 5/2005 | Gregory | |
| 2005/0166413 A1 | 8/2005 | Crampton | |
| 2006/0054189 A1 | 3/2006 | Luke et al. | |
| 2006/0054202 A1 | 3/2006 | Luke et al. | |
| 2008/0148876 A1 | 6/2008 | Hock et al. | |
| 2010/0221125 A1 | 9/2010 | Fulkerson et al. | |
| 2010/0234988 A1 | 9/2010 | Buckingham et al. | |
| 2010/0264013 A1 | 10/2010 | Burton | |
| 2011/0186657 A1 * | 8/2011 | Haviland | A62C 27/00 239/722 |
| 2011/0315165 A1 | 12/2011 | McWhorter | |
| 2012/0106882 A1 | 5/2012 | Ponnouradjou et al. | |
| 2012/0246848 A1 * | 10/2012 | Hruby | A47L 11/1625 15/98 |
| 2012/0279537 A1 * | 11/2012 | Peeters | B08B 9/0933 134/56 R |
| 2013/0000672 A1 * | 1/2013 | Bovio | B08B 9/08 134/8 |
| 2014/0079573 A1 | 3/2014 | Pabst | |
| 2015/0034176 A1 | 2/2015 | Garcia Arguelles et al. | |
| 2015/0036200 A1 | 2/2015 | Matsushita et al. | |
| 2015/0124242 A1 | 5/2015 | Pierce et al. | |
| 2016/0055268 A1 | 2/2016 | Bell et al. | |
| 2016/0107207 A1 * | 4/2016 | DesOrmeaux | B25J 9/023 134/18 |
| 2017/0173617 A1 | 6/2017 | Zilai et al. | |
| 2017/0259309 A1 | 9/2017 | Innes et al. | |
| 2017/0297738 A1 * | 10/2017 | von Flotow | B64C 27/08 |
| 2018/0104728 A1 * | 4/2018 | DesOrmeaux | B25J 13/088 |
| 2019/0134820 A1 * | 5/2019 | Holliday, Jr. | B25J 11/0085 |
| 2019/0310612 A1 * | 10/2019 | Kessler | G05B 19/4155 |

FOREIGN PATENT DOCUMENTS

| | | |
|---|---|---|
| IN | 201741036558 | 4/2017 |
| JP | 2004301665 A | 10/2004 |

(56) References Cited

FOREIGN PATENT DOCUMENTS

| WO | 2009018599 A1 | 2/2009 |
|---|---|---|
| WO | 2014019852 A1 | 2/2014 |
| WO | 2019094766 A1 | 5/2019 |

OTHER PUBLICATIONS

Oceaneering International, Inc., PCT Patent Application No. PCT/US18/060093, filed Nov. 9, 2018, Notification of Transmittal of the International Search Report and the Written Opinion of the International Searching Authority, or the Declaration dated Feb. 5, 2019, 3 pages.
Innes, Alex. G., PCT Patent Application No. PCT/US/19/036567, filed Jun. 11, 2019, Notification of Transmittal of the International Search Report and the Written Opinion of the International Search Authority, or the Declaration dated Sep. 17, 2019, 8 pages.
Lane, et al. "FY10 Engineering Innovations, Research and Technology Report" In: Lawrence Livermore National Lab. Jan. 31, 2011 (Jan. 31, 2011) retrieved on Aug. 10, 2019 (Aug. 10, 2019) from https://e-reports-ext.[lnl.gov/pdf/461932.pdf, 99 pages.
Bullseye Pumps, Bullseye B200-SPDK Vacuum Loading Solids Pump, 2017. retrieved from http://www.bullseyepumps.com/products/bullseye-b200-spdk-vacuum-loading-solids-pump?variant=31478670788, 10 pages.
Sykes Pumps, General Purpose, GP50 Pump Performance, 2017, retrieved from http://www.sykespumps.com.sa/pumps/product-specs/gp_50_75.html, 2 pages.
Pentair Southern Cross, SX60 Portable Slurry Pump, 2017, retrieved from http://southerncross.pentair.com.au/product/market/pumps/vacuum-pumps/sx60-portable-slurry-pump/, 3 pages.
Wastecorp, Pumps, Super Duty, TVP-65 Series Vacuum Pumps, 2017, brochure, 1 page.
Innes, et al., PCT Patent Application No. PCT/US2017/018120 filed Feb. 16, 2017, Notification Concerning Transmittal International Preliminary Report on Patentability, 12 pages.
RITCHIESpecs, Gradall 534D-9-45 Telescopic Forklift, 2017, retrieved from www.ritchiespecs.com, 2 pages.
Boom, Gradall Material Handler 534 D-6534 D-6 Turbo, Jul. 2002, 1 page.
Manitowoc, National Crane 600H Series Product Guide, 2012, 16 pages.
Manitowoc, National Crane 680H-TM, Aug. 2015, 4 pages.
Festo, Bionic Handling Assistant, Apr. 2012, 6 pages.
Schutz, Maxon Motor, Robotic Snake-Arm Flies Right Into Tight Spaces, 2012, 4 pages.
McMahan, W., et al., Field Trials and Testing of the OctArm Continuum Manipulator, IEEE, May 2006. pp. 2336-2341, 6 pages.
Li, Z., et al., A Novel Tele-Operated Flexible Robot Target for Minimally Invasive Robotic Surgery, Engineering Research Robotics Article, Mar. 2015, pp. 073-078, vol. 1, Issue 1, 6 pages.
Li, Z., et al., Kinematic Comparison of Surgical Tendon-Driven Manipulators and Concentric Tube Manipulators, Mechanism and Machine Theory, 2017, pp. 148-165, vol. 7, 18 pages.
Military Elevation Solutions and Tactical Trailers, KVL and KVR Telescopic Cable-Drive Masts, Sep. 2016, 3 pages.
OCRobotics, Laser Snake 2, Snake-arm robot and high-power laser integration, www.ocrobotics.com, 2016, 4 pages.
OCRobotics, Nuclear decommissioning case-study, Laser Snake, Snake-arm robot and high-power laser integration, www.ocrobotics.com, 2016, 4 pages.
Bauer, et al., Development and Deployment of the Extended Reach Sluicing System (ERSS) for Retrieval of Hanford Single Shell Tank Waste—14206 (Draft), U.S. Department of Energy, Assistant Secretary for Environmental Management, Washington River Protection Solutions, Nov. 2013, 19 pages.
Innes, et al., PCT Patent Application No. PCT/US2017/018120 filed Feb. 16, 2017, Notification of the Transmittal of the International Search Report and the Written Opinion of the International Searching Authority, or the Declaration dated May 10, 2017, 14 pages.
Pearson, M.J., et al., "Biomimetic Vibrissal Sensing for Robots," Philosophical Transactions of the Royal Society B (2011), vol. 366, pp. 3085-3096, 12 pages.
Innes, Alex, G., PCT Patent Application No. PCT/US/19/068359, filed Dec. 23, 2019, Notification of Transmittal of the International Search Report and the Written Opinion of the International Search Authority, or the Declaration dated Feb. 25, 2020, 14 pages.

\* cited by examiner

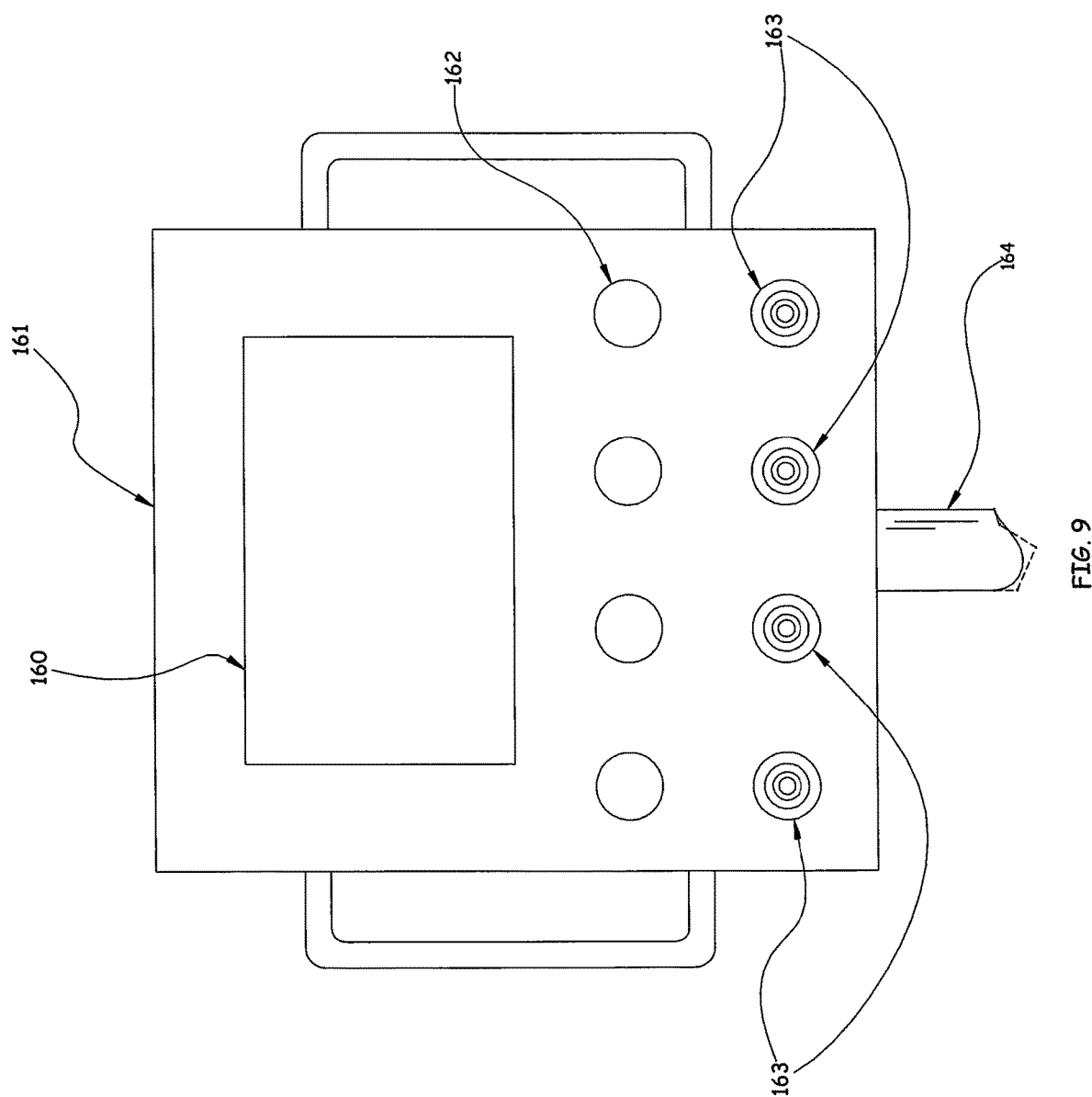

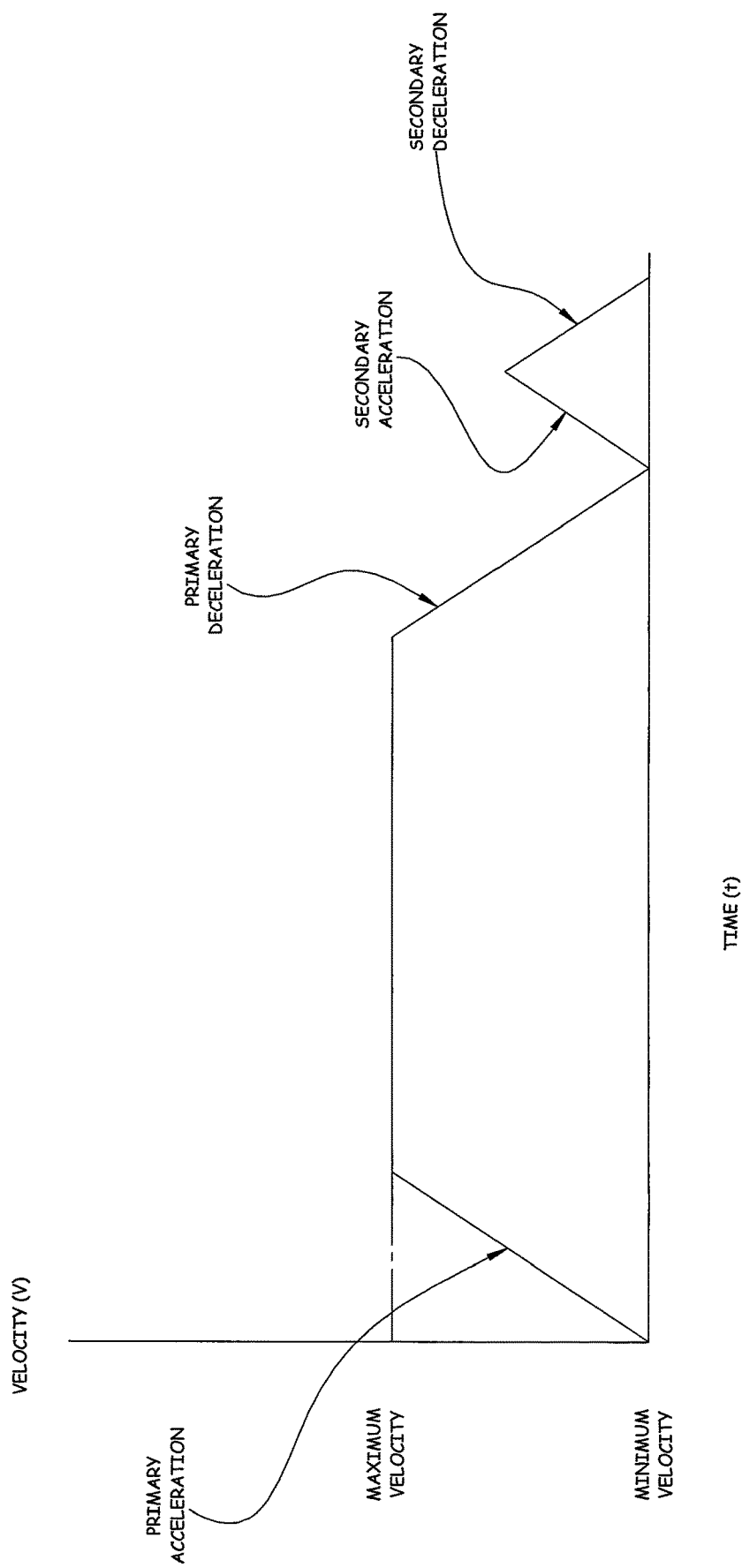

ARTICULATING ARM PROGRAMMABLE TANK CLEANING NOZZLE

FIELD OF INVENTION

This invention relates to preparing tank surfaces and applying new protective coatings to tank surfaces, and more specifically, to manual, automated, or semi-automated, articulating arm programmable tank cleaning devices, systems and methods for removing paint, rust, scale and other surface coatings and containments from storage tanks, ballast tanks, and the like, as well as to manual, automated, or semi-automated, articulating arm programmable tank cleaning devices, systems and methods for applying coatings to the surfaces of storage tanks, ballast tanks, void and tanks having hazardous vapors and dusts, and the like.

BACKGROUND AND PRIOR ART

Ballast tanks used in marine environments are regularly exposed to sea water, humidity, salt, sludge, and many harsh elements that can cause damage and oxidation at an accelerated rate. Due to this damage, removal of old coatings, contaminants, and rust in order to inspect and or reapply new coatings is paramount. However, current equipment that is capable of processing large tanks with extensive surface areas is generally large and heavy. And many tanks only have access through small openings such as manholes.

As such cutting the tank to allow egress can be time consuming and costly if even an option. This means getting equipment into the tank is impossible. Therefore, preparing metal tank surfaces i.e. walls, ceilings, structural beams, pipes, etc. for new coatings has typically been done through manual labor. However, the manual labor methods, employ techniques that are hazardous, inefficient, induce long maintenance cycles, and have high operational costs.

One popular method of cleaning uses dry abrasive media shot at high velocities to blast away surface coatings, rust and containments. However, a large amount of airborne dust can be produced. In addition, airborne particulates can cause physical harm to personnel if adequate protection is not used.

Dust from using the abrasive media can also affect performance of the subsequent coating applied. Particles moving at high velocity can become embedded into the base material causing defects and imperfections that adversely affect coating adhesion. Dust and residue left on the surface must be removed prior to painting adding a second process and increase the operational time and costs. Further, reclamation of this media is difficult, and reuse is difficult.

High pressure water or dry ice can also be employed. However, these methods do not provide proper surface profile which is crucial for proper surface adhesion. Also, dry ice produces $CO_2$ gas, which may accumulate in confined spaces, so additional ventilation equipment would need to be employed to prevent the risk of suffocation.

Additionally, cleaning large areas all at one time leaves bare steel exposed in an environment that includes high humidity, oils, salt, and other contaminants, that might promote oxidation prior to applying the paint. Also, adjacent cleaning could redistribute contaminates across the surface instead of removing them. If enough time elapses, rust bloom, such as flash rust or rust-back, will quickly develop which would require a secondary operation to remove prior to painting.

A rust inhibitor can be applied to the surface, but again, this means a secondary process along with the additional operational costs. Furthermore, with this secondary process there is of course additional significant downtime since the coating operation cannot be performed until the cleaning is complete. Depending on the size of the tank, it can it take up to many months to complete a cleaning cycle.

Additional problems exist with manual cleaning methods and personnel working in these environments who are exposed to hazardous and potentially flammable fluids, dusts and vapors. Strenuous conditions to the personnel exist due to the requirement of the use of protective gear. Also, this work mostly performed in confined spaces that require scaffolding or lifts, make it cumbersome to use the requisite handheld blast equipment. Handheld blast nozzles produce high velocities and high thrust forces that an operator must counteract. This leads to fatigue and injury.

Thus, the need exists for solutions to the above problems with the prior art.

The present invention seeks to provide an automated solution that solves the above challenges and reduces overall cycle times.

SUMMARY OF THE INVENTION

A primary objective of the present invention is to provide a manual, automated, or semi-automated, articulating arm programmable tank cleaning devices, systems and methods for cleaning tanks thus removing any residual contents including, oil, tar, sludge's and hard heels, and then paint, rust, scale and other surface coatings and containments from any type of storage tanks, ballast tanks, void tanks including those tanks having hazardous vapors and dusts, and the like, which overcomes the problems of using manual labor to clean the tanks.

A secondary objective of the present invention is to provide manual, automated, or semi-automated, articulating arm programmable tank cleaning devices, systems and methods for applying new protective coatings to the surfaces of storage tanks, ballast tanks, and tanks having hazardous vapors and dusts, and the like.

The system can provide a hydraulically or electrically controlled, articulating arm with many degrees of freedom (DOF). With this configuration, and being modular in design the arm can have a working envelope ranging from approximately 10'×approximately 10'×approximately 10' and up to approximately 50'×approximately 50'×approximately 50'.

The articulating arm can be broken down into individual components that can be light enough to allow a single operator to lift and carry. Individual components or portable assemblies can fit through an opening envelope of up to 18" in diameter while not exceeding safe weight limits of approximately 50 pounds per person when transporting into the tank by one or more personnel.

Alternatively, components and assemblies can be light enough such that one or more operators can lift and carry the individual pieces and then assemble them inside the tank or tank section. These lightweight components are compact enough to fit through manways as well as lowered down elevators, shafts or ladder galleys. This also allows the articulating arm to be modular in design with the capability to scale it up or down in size for use in varying tank size envelopes.

Quick disconnects can also be included for hydraulic, fiber optic, and electrical connections. A hydraulic quick disconnect can include, but not be limited to, a double shut-off quick coupler where mating male and female halves can be disconnected and reconnected by manually engaging or disengaging a retaining ring. The coupler can contain a spring-loaded valve that shuts off oil flow when disconnected thus preventing any nuisance dripping, drainage or leakage. Each half can be crimped to the end of a hose section.

A quick disconnect fiber optic connector can include, but not be limited to, a bayonet crimped to a fiber optic cable. The bayonet can include a twist to lock feature that secures to a mating ferrule crimped to the end of another fiber optic cable.

A quick disconnect electrical connector can include, but not be limited to, a Mil-spec circular connector where a male half containing a plurality of pins or sockets mates with a female half containing the corresponding number and type of pins or sockets. The two halves can be secured together by a sleeve integrated into the body of one half that then threads onto the mating half. Discrete wires of a cable can be crimped or soldered to the pins and sockets of the connector.

Quick release pins can be used which allow for quick simple disassembly and assembly of the system. Quick release pins can include but are not limited to, a pair of expanding collets mounted between opposing circular wedge plates, two per collet, that are captured axially on a bolt. When the nut is tightened, the wedge plates can expand the collets tightly against the inner diameters of concentric sleeves fixed to a set of articulating arms. Loosening the nut and bolt disengages the collet and releases the pin from the sleeve.

The articulating arm be can be assembled and secured on the tank floor, with magnetic feet, clamps, bolts other methods to secure the device and be supported by up to 4 adjustable legs tied into a common base. The legs can be individually adjustable in height and length allowing the articulating arm to conform to varying features in the tank.

Atop the base can be an articulating arm assembly that rotates, twists, and extends to position the end effector. The articulating arm assembly can be manual controlled, automated, or semi-automated controlled, or a combination thereof.

Manual manipulation of the articulating arm assembly can be achieved by an operator through controls on a handheld remote control or pendant. Alternatively, manipulation can be done remotely at the human machine interface (HMI) in conjunction with cameras and pointers.

Automatic manipulation can be achieved through motion profiles that are determined through software using kinematic algorithms. These profiles can be interpolated around selected features, surfaces or areas in the tank.

Using cameras, pointers, distance sensors, and a remote controller or pendant, the end effector can be positioned at specific points relative to the work. By establishing multiple points around a feature or set of features, a list of coordinates can be generated.

The remote controller can include but is not limited to, a handheld box containing the appropriate buttons, switches, and joysticks to control the articulating arm from any location within the given envelope surrounding the articulating arm.

The camera can be mounted on the distal end of the articulating arm and can include, but not be limited to, an industrial grade camera integrated with intrinsically safe or explosion proof lighting capable of transmitting a high resolution, live image to a remote screen. Features of the camera can include pan, tilt, and zoom.

The laser pointer can include but not be limited to, a device mounted to the distal end of the articulating arm capable of projected a visible dot on a surface of a tank indicating the line of sight of the end effector.

The distance sensor can include, but not be limited to ultrasound, radiofrequency or a laser such as but not be limited to a time-of-flight laser sensor that transmits light at a surface. The sensor can then determine the amount of time it takes (time-of-flight) to receive the light reflected off said surface. Using the known speed of light, the sensor can calculate the relative distance.

Dedicated instruments or cameras and software can identify the surfaces or features and draw lines or curves from point to point of those surfaces or features in such a way to form segmented and continuous paths such as zig-zags or spirals based on basic geometries such as squares, rectangles, circles, and so forth. These lines provide a map to be used as a path, i.e. tool paths that the end effector and nozzle can follow as programmed.

These tool paths are specific to the process, either coating or cleaning. A controller can take this data and output the command signals to corresponding servo valves or servo-proportional valves; therefore, synchronizing the multiple axes and effectively moving the end effector along the desired path. The controller will also sequence events as needed.

Servo valves can include but not be limited to, a valve that uses analog electrical signals ranging from 0 to approximately 100 milliamps to modulate a spool to precisely control hydraulic fluid flow to a hydraulic cylinder or motor. A servo-proportional can include but not be limited to, a valve that operates on the same principal as a servo valve, but is constructed with looser tolerances and operates with less precision. Servo-proportional valves can also operate on analog electrical signals ranging from 0-100 milliamps For cleaning, the system can use abrasives dry ice or water to blast the surfaces clean but the use of sponge blasting can rapidly remove paint, rust, scale, debris, salts, oils, and any other contamination, while at the same time, capturing most of the dust typical of a dry grit blasting operation.

The sponge can include but not be limited to synthetic foam fragments that can be impregnated with abrasive media. Abrasive media can include but not be limited to, aluminum oxide, steel grit, silica sand, garnet, glass bead, or plastic grit. Alternatively, for applications that do not require aggressive cleaning, the sponge can be used solely without any abrasive media.

By using the sponge abrasive media, there can be an elimination of nearly all of the airborne particulates that would obstruct the view of the cameras being deployed, so that real time and post blast inspection of the process is allowed during operation. Additionally, in one operation, the surface is clean, prepared, and particulate free making it ready for paint.

In conjunction with a fast cure coating, a regional blast then paint patchwork method can be employed. This greatly reduces the time and exposure of the bare metal to moisture, salt, and other contaminants; and the opportunity for condensate to occur thus, reducing the possibility of contamination and oxidation prior to painting. This provides patchwork approach, where a certain region of the tank prepped and then immediately painted, prevents the rust and contamination and provides a long lasting, durable protective coating in less processing time because the surface only needs to be blasted clean one time.

Furthermore, without any fugitive dust, an adjacent area can be blasted while a neighboring area paint is curing.

Other embodiments can use high pressure/low flow water nozzle, low pressure/high flow water nozzle, grit blasting, or dry ice blasting. Low pressure/high flow water can include but not be limited to a pressure of up to approximately 5000 psi (pounds per square inch) at a flow rate ranging from approximately 10 to approximately 500 gpm (gallons per minute). High pressure/low flow include but not be limited to, a pressure range from approximately 5,000 psi to approximately 50,000 psi at a flow rate range from 0 to approximately 25 gpm (gallons per minute).

The HMI (human machine interface) or computer interface can allow an operator to monitor, create and manipulate the process in real-time. As the articulating arm assembly is blasting or painting one section, an operator can sit at the HMI and develop, create or edit the toolpath for the next process. Once the reachable area is cleaned and painted, the device will be disassembled and moved to restart the process in the same tank or adjacent tank section.

The hydraulic power unit, coating skid, vacuum skid, and any requisite equipment can reside remotely, outside the tank. The coating skid can include, but not be limited to, a coating fluid reservoir tank, motor driven pump, and outlet connections for a delivery hose.

The blast media vacuum recovery skid can include, but not be limited to, a vacuum pump or Eductor drawing waste media into a collection reservoir that is feed by a hose connected to the articulating arm.

In the preferred embodiment, the device would be hydraulically power to providing safe operation in environments with flammable vapors or dusts. The hydraulic valve manifold and control station would reside as close as possible to the arm but outside of any classified hazardous area that can have flammable vapors or dust, this location could be just adjacent to the tank being blasted and or painted.

In one embodiment, the hydraulic valve manifold and control station can be equipped with explosion proof or intrinsically safe components allowing operation in a classified hazardous zone where flammable gases or dust may exist.

The hydraulic power unit can include, but not be limited to, the requisite hydraulic pump driven by an electric motor to supply the system with flow and pressure of hydraulic fluid from an integrated storage reservoir. Supply and return hoses can connect between the hydraulic power unit and the hydraulic manifold.

The hydraulic manifold can include, but not be limited to, a block of metal or plastic machined with varying passageways to distribute hydraulic fluid to a plurality of valves mounted along the surfaces of the block. The valves can include but not be limited to, servo valves or servo-proportional valves. Mounted on the manifold frame can be a control panel enclosure housing a motion controller that sends and receives inputs and outputs (I/O) in order to control the servo valves.

Another embodiment of the device would be using explosion proof linear actuators and electric motors and controllers. In this embodiment the actuators and motors would manipulate the arm sections. The motors and actuators would be powered by cables coming from the device within the tank section being cleaned to an electrical motion control and power supply. This could be inside the same tank or just adjacent to the tank where the operator is located.

The control station can include, but not be limited to, a human machine interface (HMI) housed in a portable case equipped with fold out legs. The HMI can include, but not limited to, software, display screen, keyboard, pushbuttons, switches, and joysticks used to control and interact with the articulating arm assembly.

The articulating arm assembly can include crash detection features to protect itself from crashing into objects within the working environment through the use of electro mechanical whiskers or electronic sensors.

Articulating arm thrust balancing features and anti-sway motion control can also be included to overcome unwanted deflections and improve accuracy. Blasting media through a nozzle causes a thrust force that can be counteracted to prevent unwanted deflection and swaying of the articulating arm assembly. Balancing the thrust force can be accomplished by, but not limited to, a pair of nozzles blasting media in an equal but opposing direction. Additionally, when the arm comes to a sudden stop or switches direction, the compliance of the articulating arm can cause deflections and swaying that can lead to oscillations and a loss of control. Anti-sway motion control can be accomplished, but not be limited to, by a sudden stop and then progression of motion prior to the end of motion or switching of direction of the end effector.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 9 illustrates a typical layout for the remote control used with the cleaning system of FIG. 1.

FIG. 11 illustrates a speed vs. time curve velocity profile, as the arm travels along a toolpath. The triangular acceleration and decelerations shown at the end of the velocity profile are provided by an anti-sway algorithm within the control to provide greater position accuracy.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
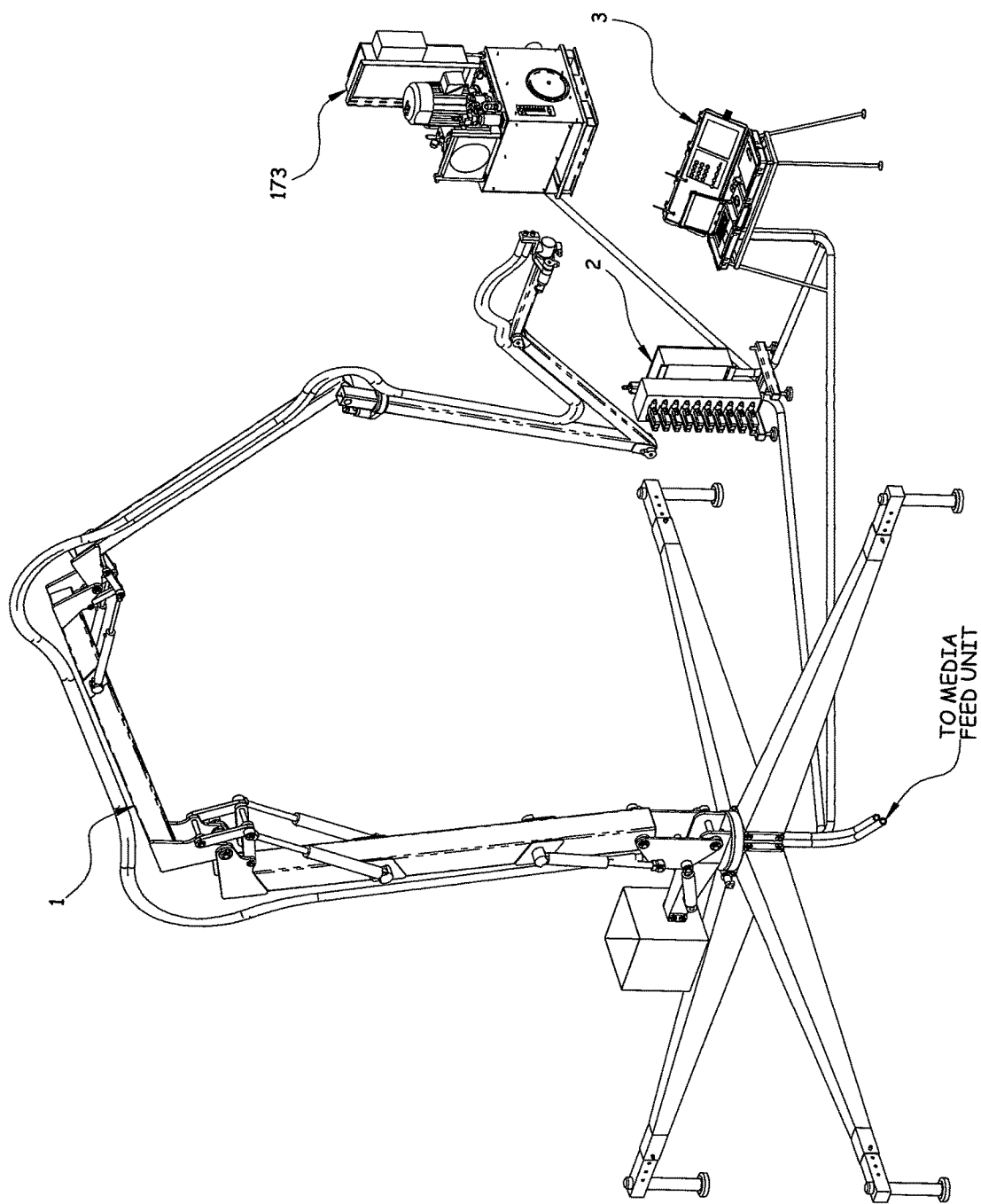
FIG. 1 is a perspective view of an articulating arm cleaning system.
Figure 5:
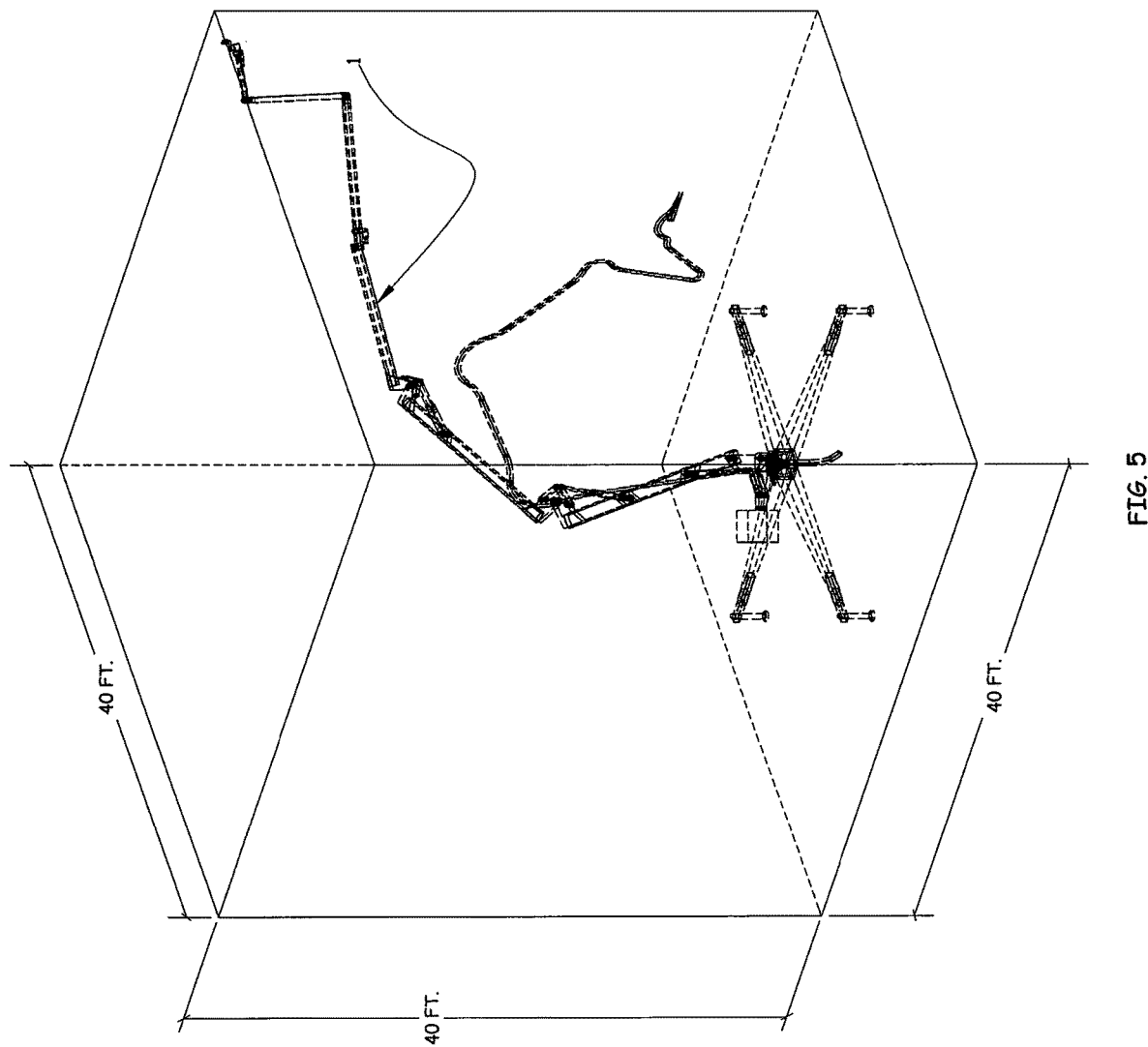
FIG. 5 is a perspective view of the working envelope of the articulating arm used in the system of FIG. 1.

A list the components will now be described.
1 articulating arm
2 hydraulic control system
3 control station
4 Adjustable foot extension
5 leg extension
6 quick release pins
7 upper leg beam
8 counterbalance
10 turntable
11, 12, 13, 14, 15, 16, 17, 18, 19 arm members
20, 21, 22, 23 hydraulic cylinders
24, 25, 26, 27, 28, 29, 30 hydraulic gear motors
31, 32, 33, 34, 35, 36, 37 quick release pins
38 slew ring
39 worm wheel
40 worm
41 six bar linkage
43 base structure
44 end effector
45 blasting nozzles
46 nozzle holder
47 media conveyance hose
50 Magnetic feet
51 first axis
52 second axis
53 third axis
54 fourth axis
55 fifth axis
56 sixth axis
57 seventh axis
58 eighth axis
59 ninth axis
70 inner arm section
71 telescoping outer arm section
72 adjustable slide bearing plates
73 hydraulic cylinder
80 precision servo valves
81 manifold block
82 electrical panel
83 common frame structure
100, 101, 102, 103, 104, 105, 106, 107, 108, 109, 110 absolute encoders
150 keyboard
151 user screen
152 carrying case
153 mobile stand
154 mouse
155 central processing unit (CPU)
156 pushbuttons
158 joystick controllers
160 touchscreen
161 handheld case
162 pushbuttons
163 joystick controllers
164 flexible electrical cable
171 hydraulic manifold
172 control station
173, 174, 175, 176 ancillary equipment
173 hydraulic power unit
174 coating skid
175 vacuum skid
180 arm section
181 spur gear
182 bearings
183 adjacent arm section
184 motor
185 pinion gear
186 gear set
190 bearings
191 shaft
193 hydraulic gear motor
195 drive sprocket
196 roller chain
197 sprocket
301 Whisker Style Limit Switches
302 3D Imaging Sensor
303 Laser Pointer
304 Camera
305 Thrust Balancing Nozzles
350 Collet
351 Hex Head Bolt
352 Wedge Plate
353 Spacer Shaft
354 Hex Nut FIG. 1 is a perspective view of an articulating arm programmable tank cleaning nozzle system according to a preferred embodiment of the invention. The system is comprised of a articulating arm 1, hydraulic control system 2, and control station 3. FIG. 5 depicts the articulating arm 1 inside a working envelope ranging from approximately 10'×approximately 10'×approximately 10' up to approximately 50'×approximately 50'×approximately 50'.

Figure 12:
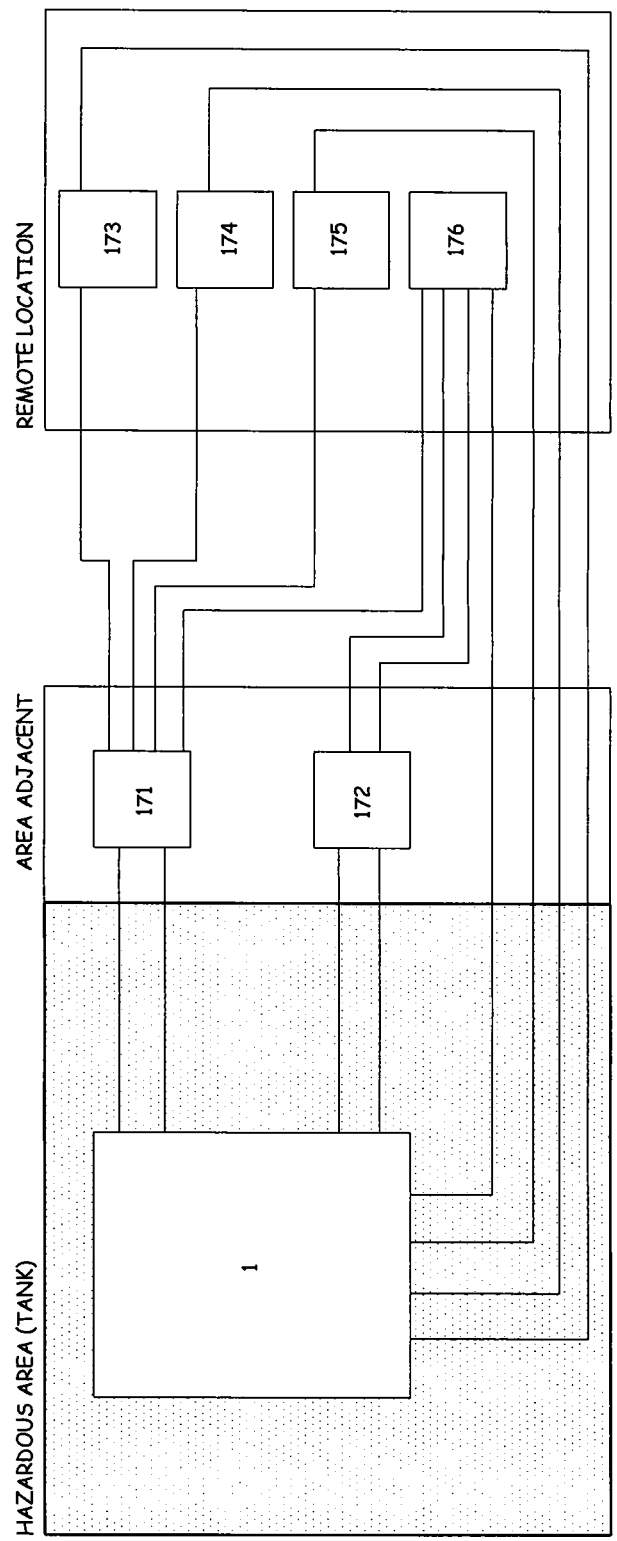
FIG. 12 illustrates a block diagram of an installation arrangement of the articulating arm and ancillary equipment for areas that contain hazardous dust and vapors.

With reference to FIG. 12, the articulating arm can be mounted in an area with hazardous dust and vapors where the hydraulic manifold 171 and control station 172 can be mounted adjacent the classified area as close to the articulating arm as possible. Ancillary equipment 173, 174, 175, 176 can be mounted remotely.

The present invention can be connected to ancillary equipment such as a hydraulic power unit 173, coating skid 174, vacuum skid 175, or abrasive delivery unit 176. In certain embodiments, the ancillary equipment can include a high pressure water delivery unit or dry ice system. The hydraulic power unit 173 can include, but not be limited to, the requisite hydraulic pump driven by an electric motor to supply the system with flow and pressure of hydraulic fluid from an integrated storage reservoir. Supply and return hoses can connect between the hydraulic power unit and the hydraulic manifold.

The coating skid can include, but not be limited to, a coating fluid reservoir tank, motor driven pump, and outlet connections for a delivery hose. The vacuum skid can include, but not be limited to, a vacuum pump drawing waste media into a collection reservoir that is feed by a hose connected to the articulating arm.

Figure 2A:
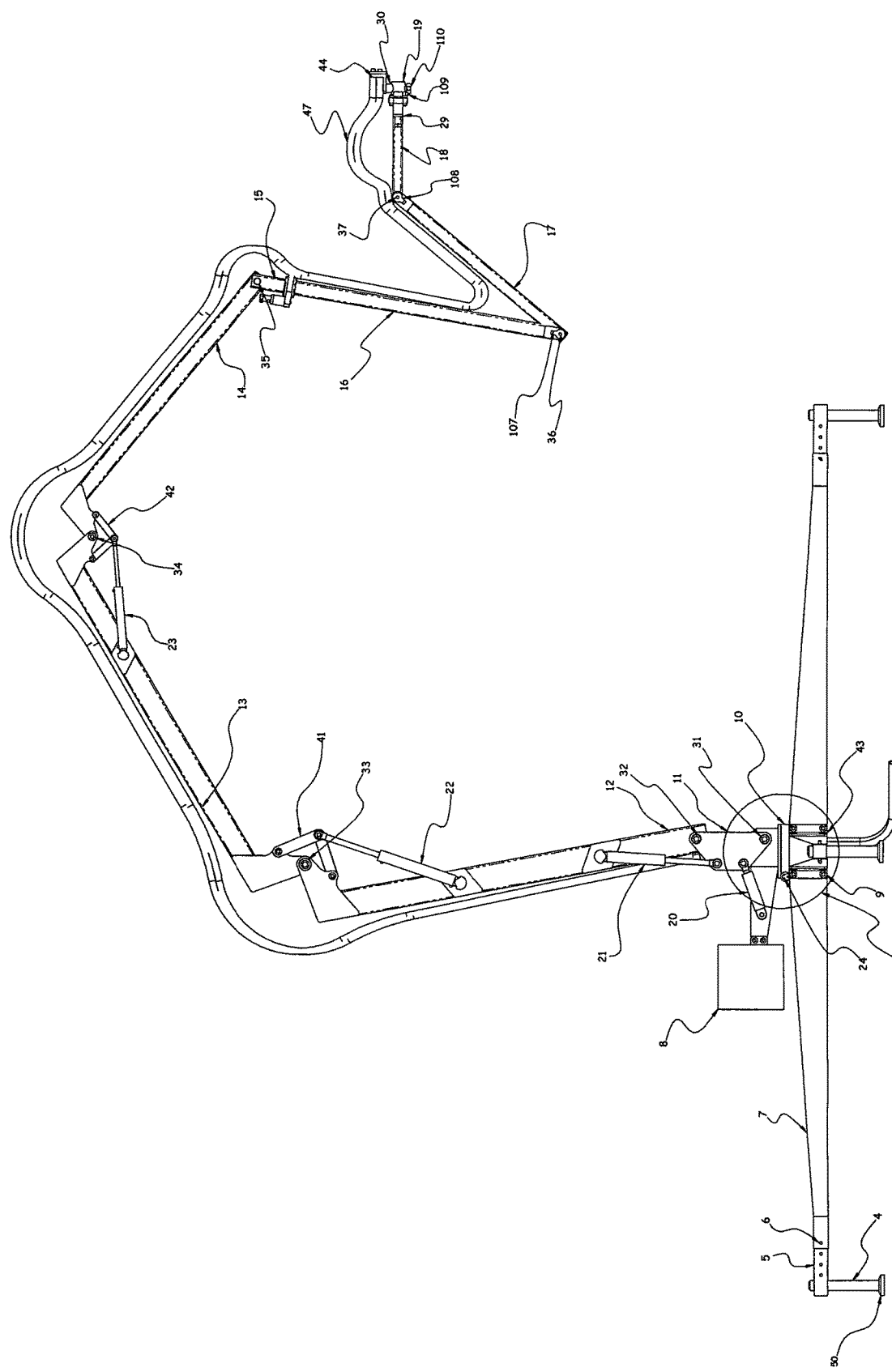
FIG. 2A is a side elevation view of the articulating arm used in FIG. 1.
Figure 2B:
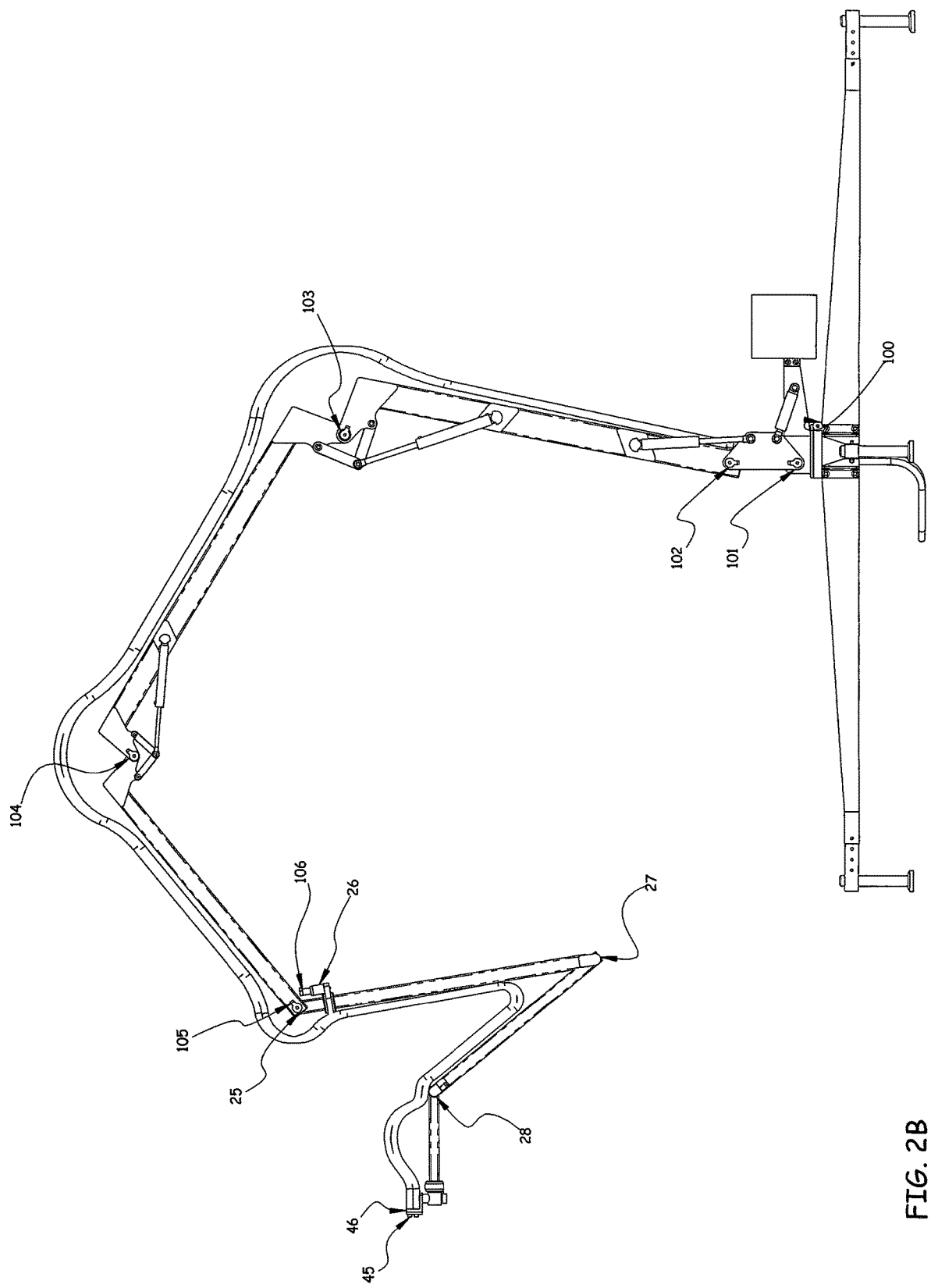
FIG. 2B is an opposite side elevation view of the articulating arm of FIG. 2A.
Figure 2C:
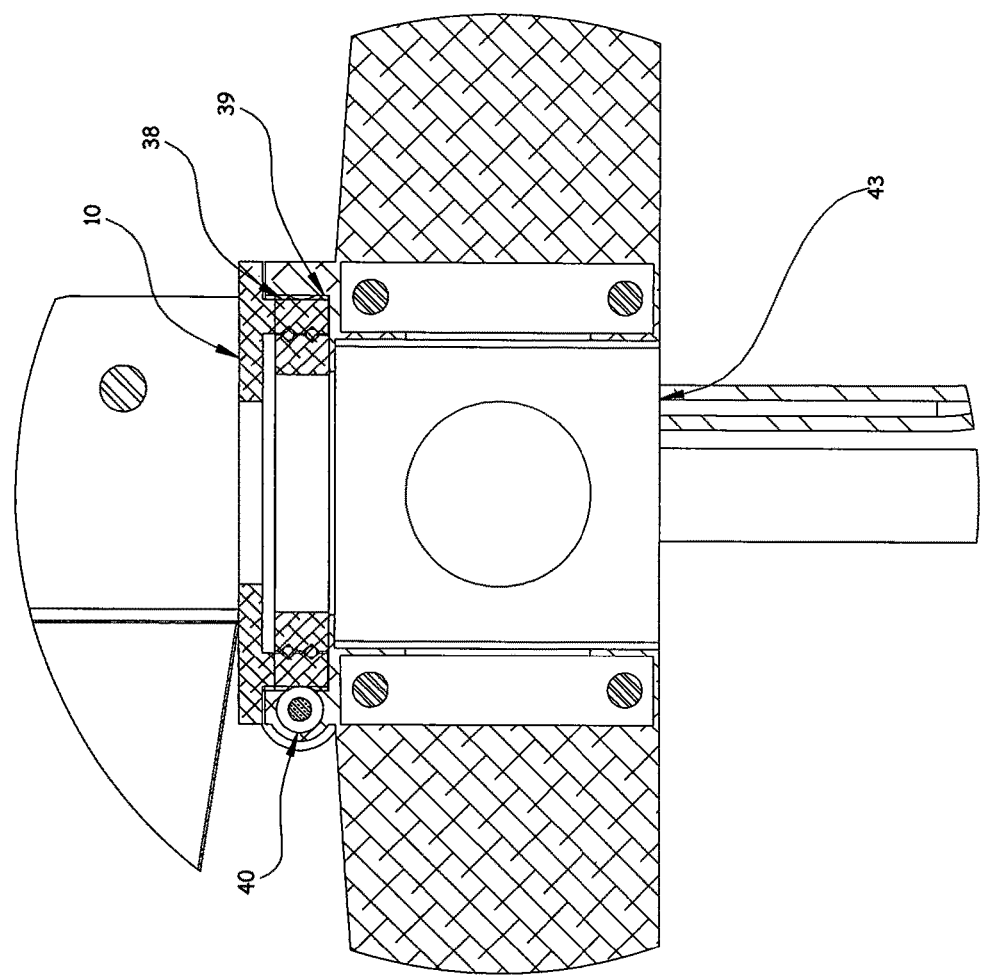
FIG. 2C is a section view of the base structure and turntable of the system shown in FIG. 2A.

FIG. 2A is a side elevation view of the articulating arm used in the system of FIG. 1. FIG. 2B is an opposite side elevation view of the articulating arm of FIG. 2A. FIG. 2C is a section view of the base structure and turntable of FIG. 2A.

Referring to FIGS. 2A, 2B and 2C, the robotic arm 1 can include four adjustable legs supporting the base structure 43 and arm members 11-19 mounted atop a turntable 10. Each leg can be attached to through quick release pins 9. Each adjustable leg can be comprised of the upper leg beam 7, leg extension 5, magnetic foot 50, and quick release pins 6. The adjustable foot extension 4 can be configured to thread into the leg extension 5. The leg extension 5 mates with the upper leg beam 7 and is secured with quick release pins 6. Several pin holes can be located down the length of the leg extension 5 allowing adjustment when there are varying obstructions preventing proper placement of the feet.

In one embodiment, the legs can also be adjusted radially permitting greater flexibility during installation. Each adjustable foot extension 4 can be manually adjusted to square and level the articulating arm relative to the tank.

In one embodiment, the legs and feet can be hydraulically deployed and adjusted. In an alternate mounting method, the articulating arm assembly can be mounted in multiple orientations and locations.

The articulating arm assembly can be equipped with adapter plates that mount to manways, holes, or any other features with adequate structural stability.

Figure 3:
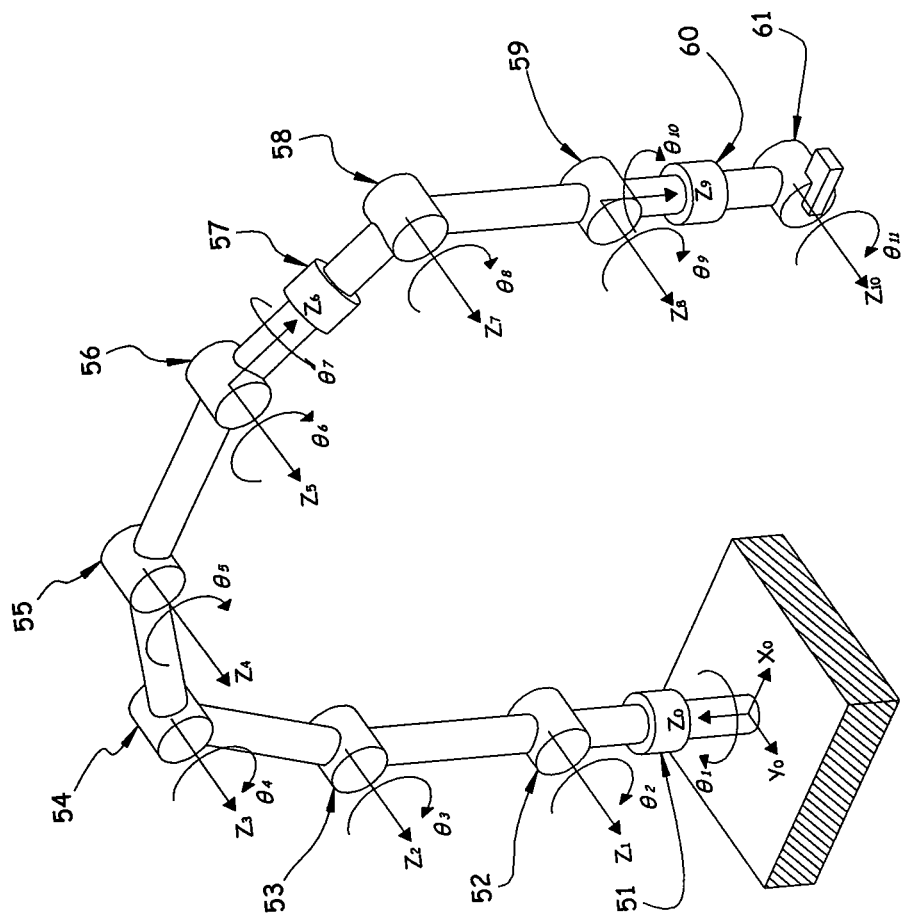
FIG. 3 is a perspective simplified kinematic diagram of the articulating arm of the preceding FIGURES with 11 degrees of freedom.

FIG. 3 illustrates 11 degrees of freedom comprised of axes 51-61 and FIGS. 2A-2C show arm members 11-19 coupled at each axis 51-61 through quick release pins 31-37 and driven by hydraulic cylinders 20-23 or hydraulic gear motors 24-30.

Figure 16A:
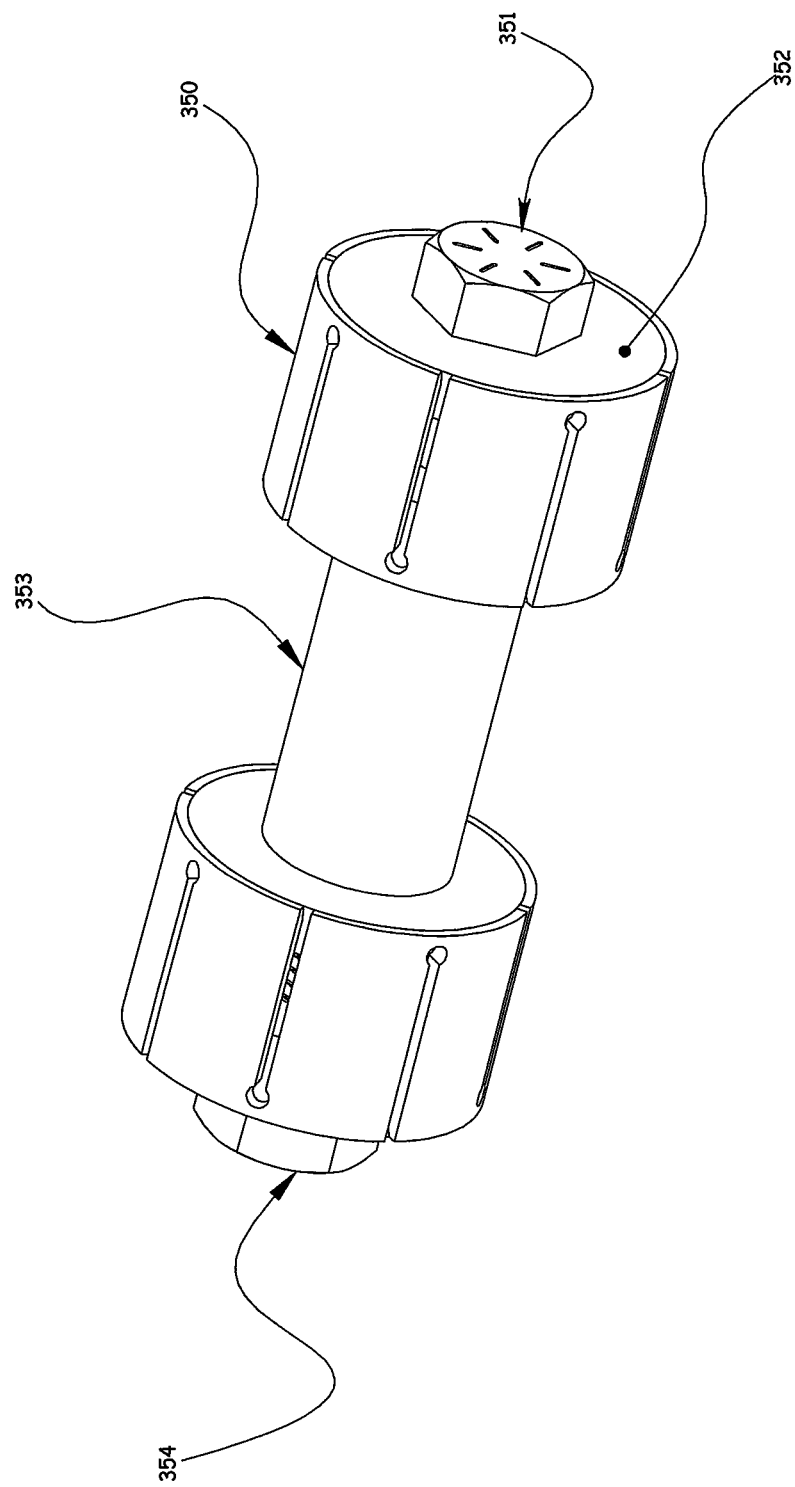
FIG. 16A shows an isometric view of a quick release pin referred to in FIG. 2.
Figure 16B:
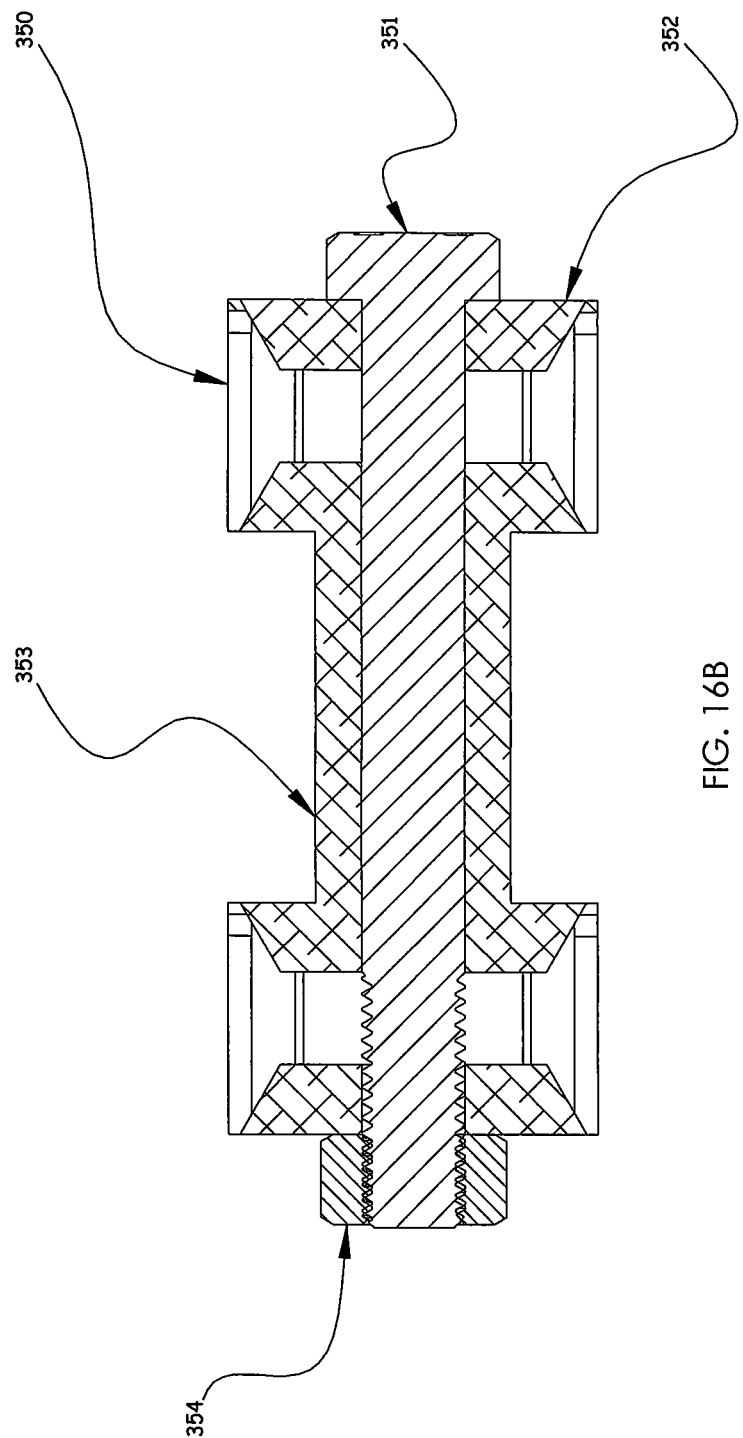
FIG. 16B shows a section view of the quick release pin of FIG. 16A.

FIGS. 1 and 2A show the use of quick release pins 31-37, which are shown in greater detail in FIGS. 16A and 16B. In reference to FIGS. 16A and 16B, the quick release pins 31-37 can be comprised of a pair of expanding collets 350 mounted between opposing circular wedges. The outer wedge plates 352 can be captured concentrically on a hex bolt 351 along with an opposing wedge that is integrated on a spacer shaft 353 also mounted concentrically on the hex bolt 351. This keeps the collets spaced axially so that when a hex nut 354 is tightened on to the hex bolt 351, the opposing wedges expand the collets 350 tightly against the inner diameters of concentric sleeves fixed to a set of articulating arms members 11-19. Loosening the nut and bolt disengages the collet and releases the pin from the sleeve. This eliminates anti-backlash due to shaft to hole clearances, runout, and tolerance stack up. Hoses, electric wires and cables can each be affixed to each arm section member where each end is terminated with quick disconnect fittings or connectors.

Referring to FIG. 3, the first axis 51 can be comprised of the base structure 43 and turntable 10 that are coupled through a slew ring 38. The turntable 10 is driven by a hydraulic motor 24 through a gear set for up to +/−approximately 180 degrees of rotation. In the preferred embodiment, the gear set is comprised of a worm 40 and worm wheel 39 integrated into the slew ring 38. In another embodiment, the gear set is a pinion gear and spur gear integrated into the slew ring 38. The arm assembly can be attached to the turntable 10 such that as the turntable 10 rotates so does the arm assembly.

The second axis 52 can be comprised of hydraulic cylinders 20 coupled between the turntable 10 and the adjacent arm section 11 to achieve up to approximately 90 degrees of rotation. Actuating the cylinders 20 rotates the arm section 11 about the axis 52 in a clockwise or counterclockwise direction. In another embodiment, a hydraulic gear motor mounted about the axis 52 can rotate the arm section 11 up to +/−approximately 180 degrees.

The third axis 53 can be comprised of hydraulic cylinders 21 coupled between adjacent arm sections 11 and 12 to achieve up to approximately 90 degrees of rotation. Actuating the cylinders 21 rotates the arm section 12 about the axis 53 in the clockwise or counterclockwise direction. In another embodiment, a hydraulic gear motor mounted at the axis 53 can rotate the arm section 12 up to +/−approximately 180 degrees.

The fourth axis 54 can be comprised of hydraulic cylinders 22 coupled between adjacent arm section 12 and 13 through a 6-bar linkage 41 to achieve up to approximately 180 degrees of rotation. Actuating the cylinders 22 rotates the arm section 13 about the axis 54 in the clockwise or counterclockwise direction. In another embodiment, a hydraulic gear motor mounted at the axis 54 can rotate arm section 2 up to +/−approximately 180 degrees.

The fifth axis 55 can be comprised of hydraulic cylinders 23 coupled between arm sections 13 and 14 through a 6-bar linkage 42 to achieve up to approximately 180 degrees of rotation. Actuating these cylinders rotates the arm section 14 about the axis 55 in the clockwise or counterclockwise direction. In another embodiment, a hydraulic gear motor mounted at the axis 55 can rotate arm section 3 up to +/−approximately 180 degrees.

The sixth axis 56 can be comprised of a hydraulic gear motor 25 located at axis 56 to rotate the arm section 15 up to +/−approximately 180 degrees. In another embodiment, hydraulic cylinders can be coupled between arm sections 14 and 16 through a 6-bar linkage to achieve up to approximately 180 degrees of rotation.

The seventh axis 57 can be comprised of a hydraulic gear motor 26 driving a gear set 186 on the end of arm section 16.

Figure 13:
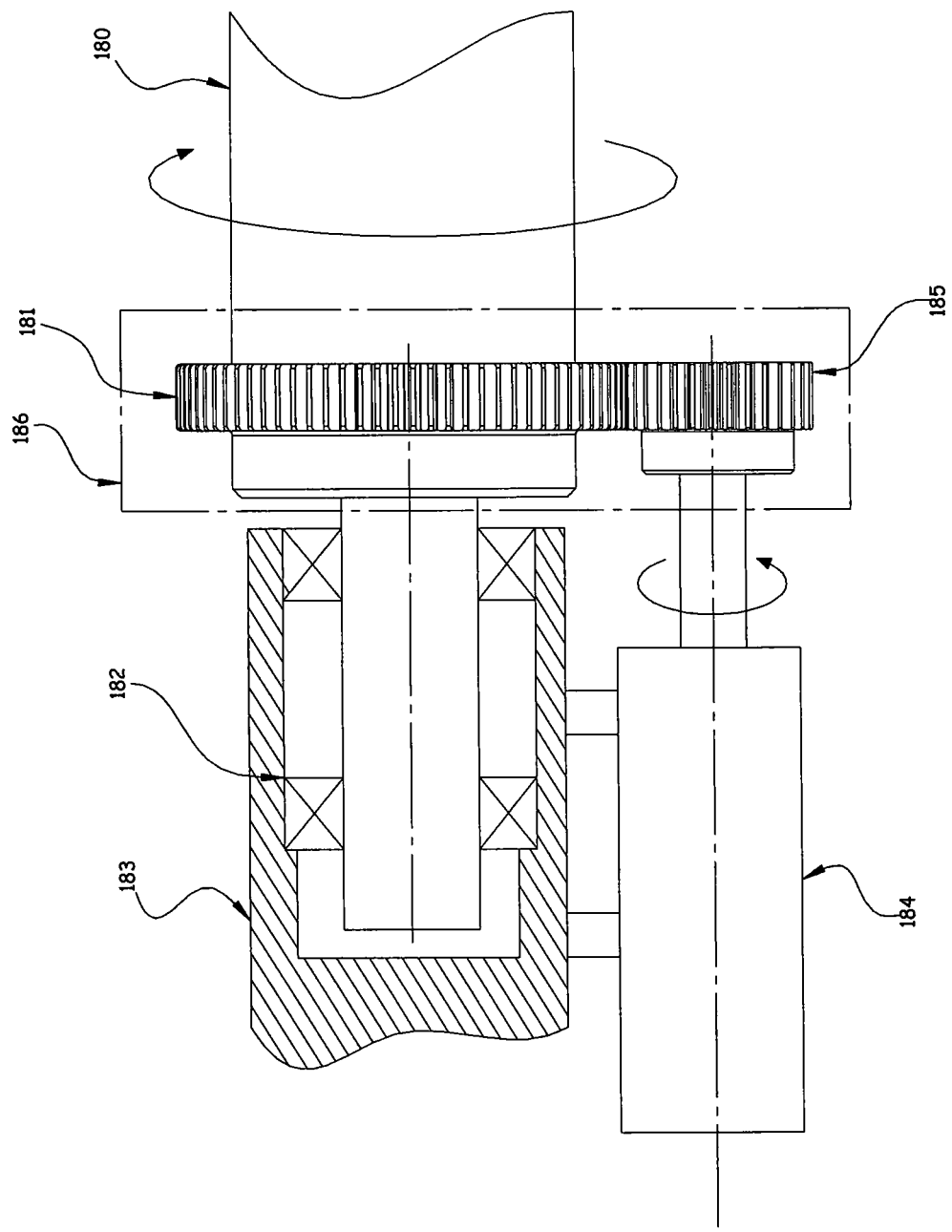
FIG. 13 illustrates a diagram of a spur gear set used to provide +/−180 degrees of twisting arm rotation.

Axis 57 rotates arm section 16 in a twisting motion to achieve up to +/−approximately 180 degrees of motion. FIG. 13 shows the gear set 186 being comprised of a pinion gear 185 on the end of a motor 184 shaft with a corresponding spur gear 181 that is mounted to an arm section 180. Arm section 180 is then coupled to an adjacent arm section 183 through a set of bearings 182. In another embodiment, the gear set can be comprised of a worm with the worm wheel mounted to an arm section and coupled to an adjacent arm section through a bearing assembly.

The eighth axis 58 can be comprised of a hydraulic gear motor 27 located at axis 58 to rotate the arm section 17 up to +/−approximately 180 degrees. In another embodiment, hydraulic cylinders can be coupled between arm section 16 and 17 through a 6-bar linkage to achieve up to approximately 180 degrees of rotation.

The ninth axis 59 can be comprised of a hydraulic gear motor 28 located at axis 59 to rotate arm section 18 up to +/−approximately 180 degrees. In another embodiment, hydraulic cylinders can be coupled between arm section 17 and 18 through a 6-bar linkage to achieve up to approximately 180 degrees of rotation.

The tenth axis 60 can be comprised of a hydraulic gear motor 29 driving a gear set on the end of arm section 18. Axis 60 can rotate arm section 19 in a twisting motion to achieve up to +/−approximately 180 degrees of motion.

FIG. 13 shows the preferred embodiment where the gear set comprises a pinion gear 185 with a corresponding spur gear 181 mounted to an arm section 180 and coupled to an adjacent arm section 183 through bearings 182. In another embodiment, the gear set can be comprised of a worm with the worm wheel mounted to an arm section and coupled to an adjacent arm section through a bearing assembly.

Figure 14:
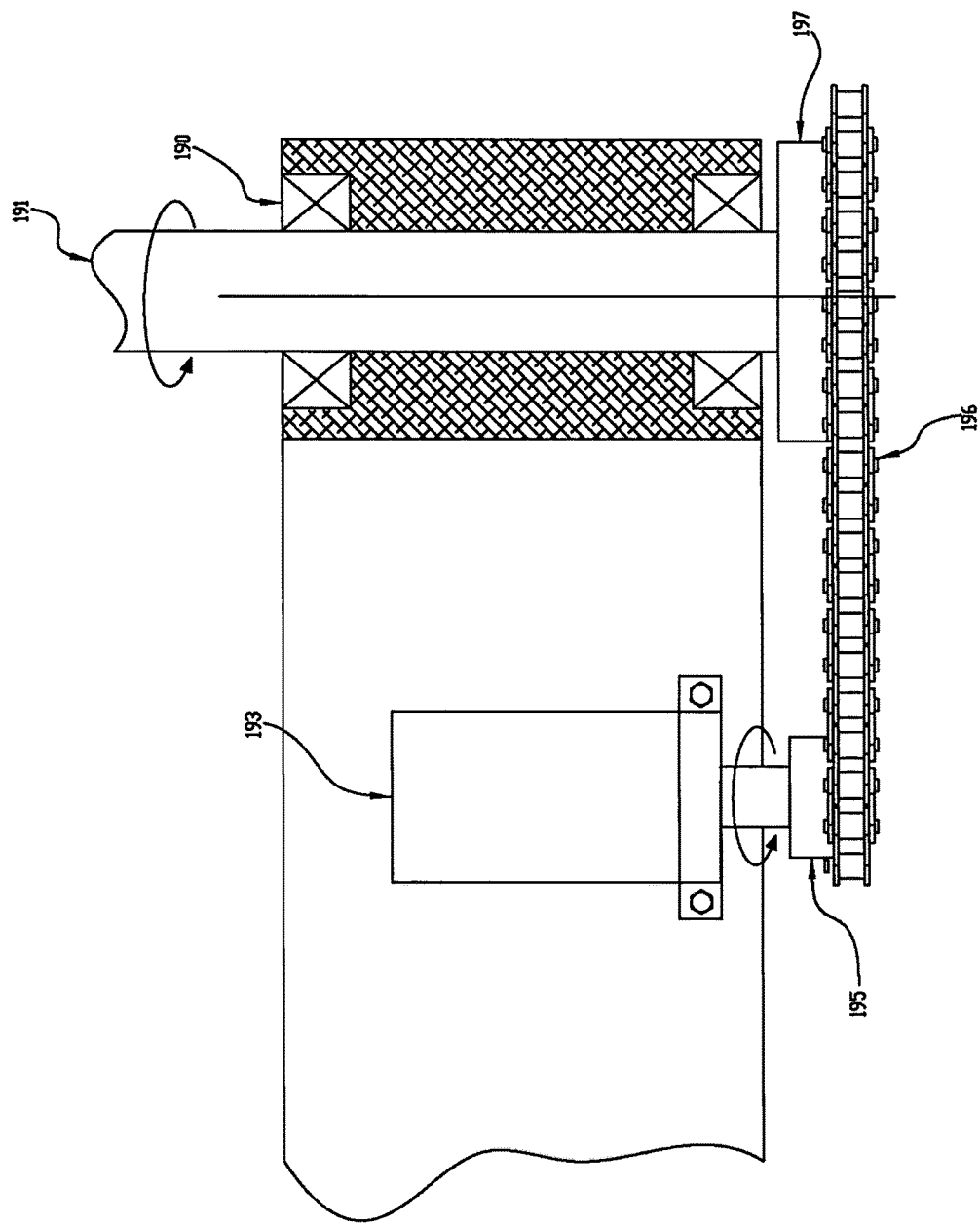
FIG. 14 illustrates a diagram of a chain drive used to provide +/−180 degrees of twisting rotation of the end effector.

The eleventh axis 61 can be comprised of a hydraulic gear motor 30 located at axis 61 to rotate the end effector 44 up to +/−approximately 180 degrees. FIG. 14 shows another embodiment where a drive sprocket 195 mounted on the output shaft of a hydraulic gear motor 193 mounted to an adjacent arm is coupled through a roller chain 196 to a sprocket 197. Supported by bearings 190, a shaft 191 drives the end effector 44 achieving up to +/−180 degrees of rotation. The end effector 44 is comprised of dual blasting nozzles 45 and a nozzle holder 46. Connected to the nozzles 45 is a media conveyance hose 47 that can be fed from a media feeder unit.

Another embodiment can include hydro blasting jets consisting of a rotating nozzle dispensing high or low pressure water. Low pressure/high flow water can include but not be limited to, a pressure of up to approximately 5000 psi (pounds per square inch) at a flow rate ranging from approximately 10 to approximately 500 gpm (gallons per minute). High pressure/low flow can include, but not limited to, a pressure range from approximately 5,000 psi to approximately 50,000 psi at a flow rate range from 0 to approximately 10 gpm.

In another embodiment, the jet can use low pressure/high flow water.

In other embodiments, grit blasting or dry ice blasting nozzles can be incorporated and are comprised of two nozzles and nozzle holders. Connected to the nozzles can be a media conveyance hose running back to the media feeder unit.

Figure 6:
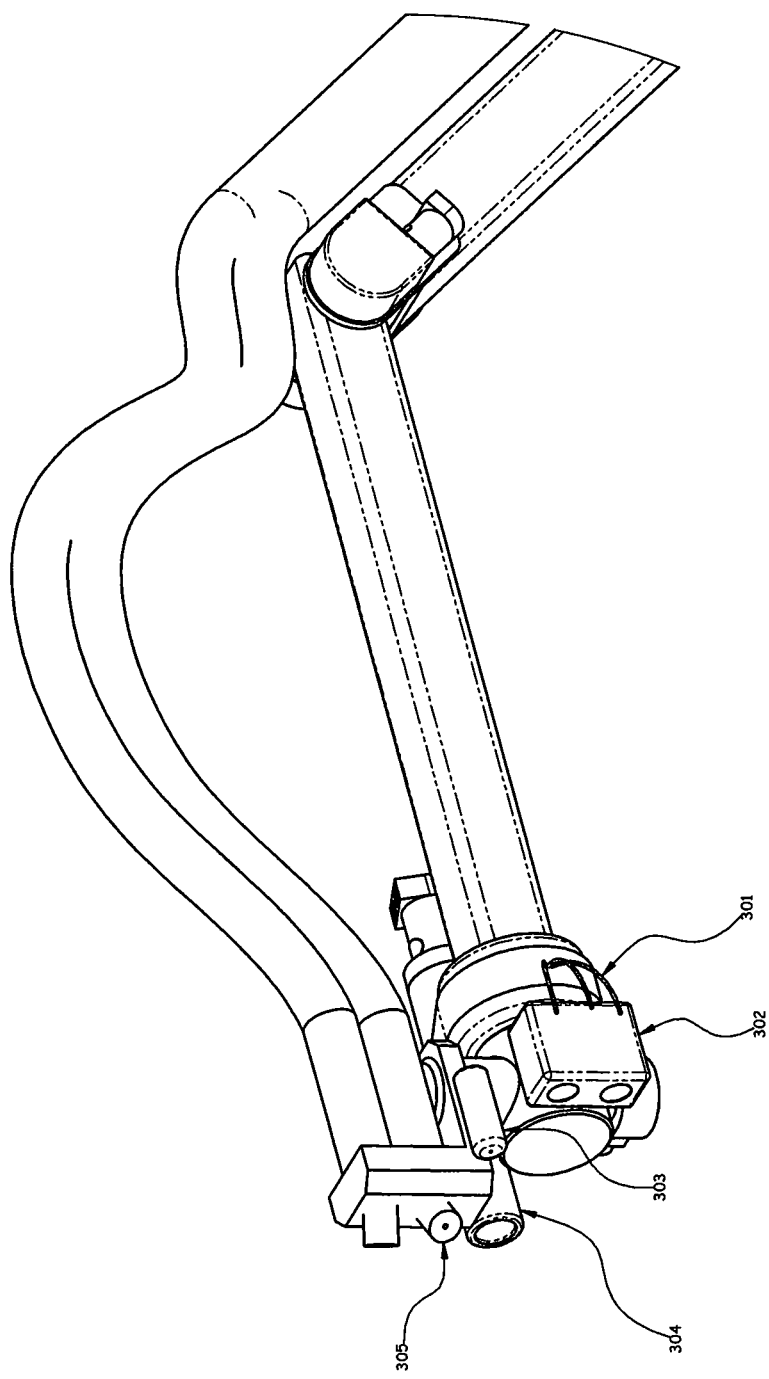
FIG. 6 is an isometric view at the distal end of the articulating arm assembly used in the cleaning system of FIG. 1.

In reference to FIG. 6, certain embodiments can include thrust balancing nozzle 305 mounted in an equal and opposing direction. In certain embodiments, the nozzle assembly can have an additional set of nozzles 305 mirrored about the rotational axis.

In a further embodiment, a right and left arm are mounted at the distal end of an arm sections 11-18. Each arm can be comprised of arm sections, axes, linkages, actuators and nozzle assemblies. Actuators can include, but not be limited to, hydraulic cylinders constructed of tube, rods, and seals to provide linear motion with the presence of hydraulic flow and pressure. Alternatively, hydraulic gearmotors can be constructed of a housing that contains vanes that rotate under hydraulic flow and pressure. Attached to the vanes can be an output shaft that drives a gearbox. The gearbox can include, but not be limited to, a planetary gearbox.

Nozzle assemblies can contain a plurality of nozzles that direct abrasive media at the surface. The nozzles can include but not be limited to, short length sandblasting nozzles with an internal diameter up to approximately 1". The nozzle assemblies can include, but not be limited to, machined mount blocks located that the distal end of the articulating arm assembly. The blocks can clamp the outside diameter of the nozzle and secure the nozzles in place.

Referring to FIG. 2A, the counterbalance 8 can be filled with weights or include a water filled bladder that can be emptied such that it becomes lightweight when relocating the articulating arm. The bladder can be constructed of rubber, plastic, or any combination of flexible and durable materials capable of storing water.

Figure 4A:
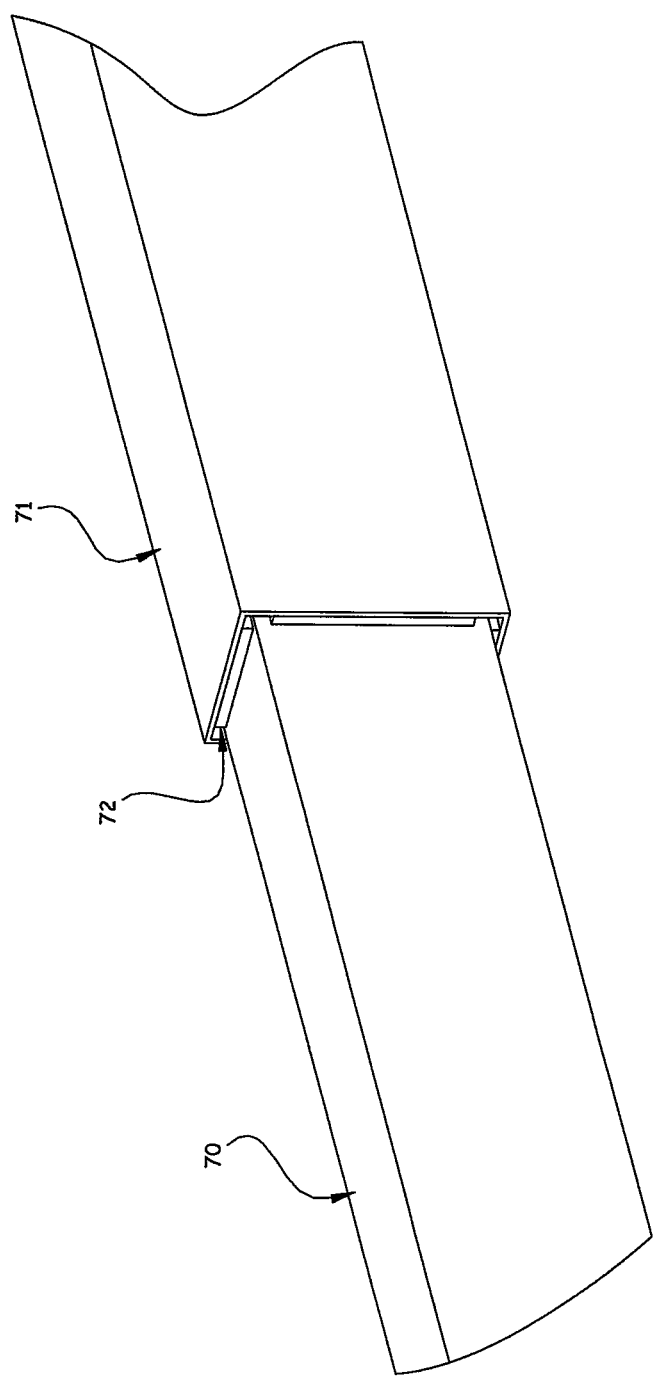
FIG. 4A is a perspective enlarged view of the telescoping arm with slide bearing plates used in the system of FIG. 1.
Figure 4B:
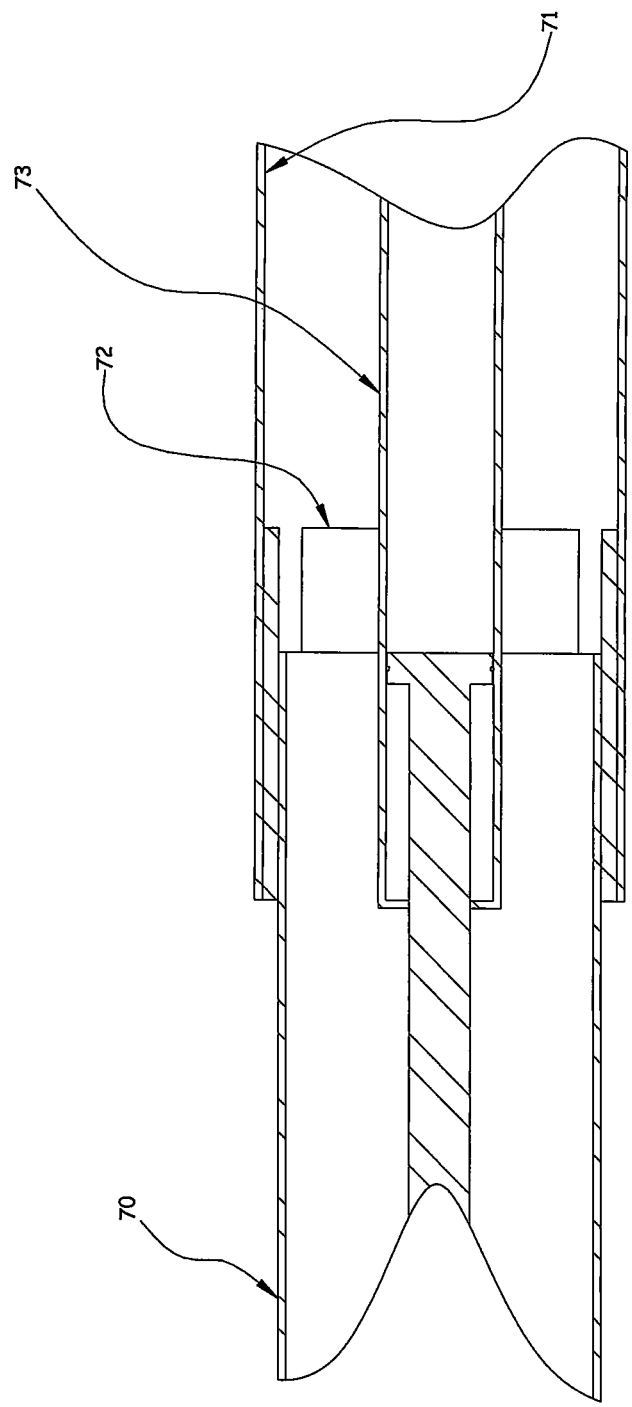
FIG. 4B is a cross-sectional view of the telescoping arm with slide bearing plates of FIG. 4A.

FIG. 4A is a perspective view of the telescoping arm with slide bearing plates used in the system of FIG. 1. FIG. 4B is a cross-sectional view of the telescoping arm with slide bearing plates of FIG. 4A.

Referring to FIGS. 4A and 4B, an alternate embodiment can include an axis comprised of a hydraulic cylinder 73 located internal to an arm section 70 and coupled to a telescoping arm section 71 to achieve linear extension and retraction. The inner arm section 70 can be supported by the outer arm section 71 through adjustable slide bearing plates 72. Positional feedback can be sensed through a linear variable displacement transformer (LVDT), a magnetostrictive linear position sensor, lasers, or string pots. In certain embodiments, the linear position sensors can operate in areas with hazardous vapors and dusts.

The LVDT can include, but not be limited to, a Macro Sensors HLR Series sensor with up to +/−10" of stroke. The magnetostrictive linear position sensor can include, but not be limited to, a Balluff BTL5 series sensor with up to +/−10" of stroke and serial interface.

The string pot can include, but not be limited to, a draw string wound on a spring-loaded spool that is coupled to a shaft of a rotary encoder. As the string is extended or retracted, the spool rotates the encoder shaft. The change in rotary position can then be correlated into a linear displacement and a relative position can be calculated.

A laser distance sensor can include, but be limited to, a time-of-flight laser sensor that transmits light at a surface. The sensor can then determine the amount of time it takes (time-of-flight) to receive the light reflected off said surface. Using the known speed of light, the sensor can calculate the relative distance.

In a preferred embodiment, all major structural members of the articulating arm 1 can be fabricated from a combination of light weight high strength materials such as but not limited to carbon fiber and metal plates, tubes, and bars that are bonded with adhesive and mechanically reinforced to form structural shapes.

The mechanical reinforcement can be done by blind hole riveting, friction stir riveting, fastening with nuts and bolts, fastening with screws and threaded inserts, welding or any other mechanical method that secures two pieces together.

In one embodiment, all major members can be constructed of carbon fiber. In another embodiment, all major members can be constructed of high strength metals such as titanium or aluminum using standard fabrication methods. Remaining load bearing components can be constructed from carbon steel, stainless steel, aluminum, bronze, plastic, or any other materials common to industrial equipment.

In reference to FIG. 6, an inspection system can be mounted on the distal end of the articulating arm 1 comprised of a camera 304 that can include a housing, integrated lighting, and protective glass. In one embodiment, the camera 304 includes pan, tilt, and zoom functions. In certain embodiments, the camera can transmit an image to a display over a fiber optic cable allowing operation in an area with hazardous and explosive vapors and dusts In other embodiments, a protective shutter can be mounted in front of the camera.

Distance measuring can be accomplished through a laser sensor mounted on the distal end of the articulating arm. In other embodiments, the distance sensor could include an IR (infrared radiation) sensor, LiDAR (light detection and ranging), or any other noncontact technique to obtain distance measurements.

In certain embodiments, a laser pointer is utilized to pinpoint a location to be measured. Referring to FIG. 6, a laser pointer 303 can be mounted adjacent to the end effector coordinated with the end effector's line of sight.

Figure 15:
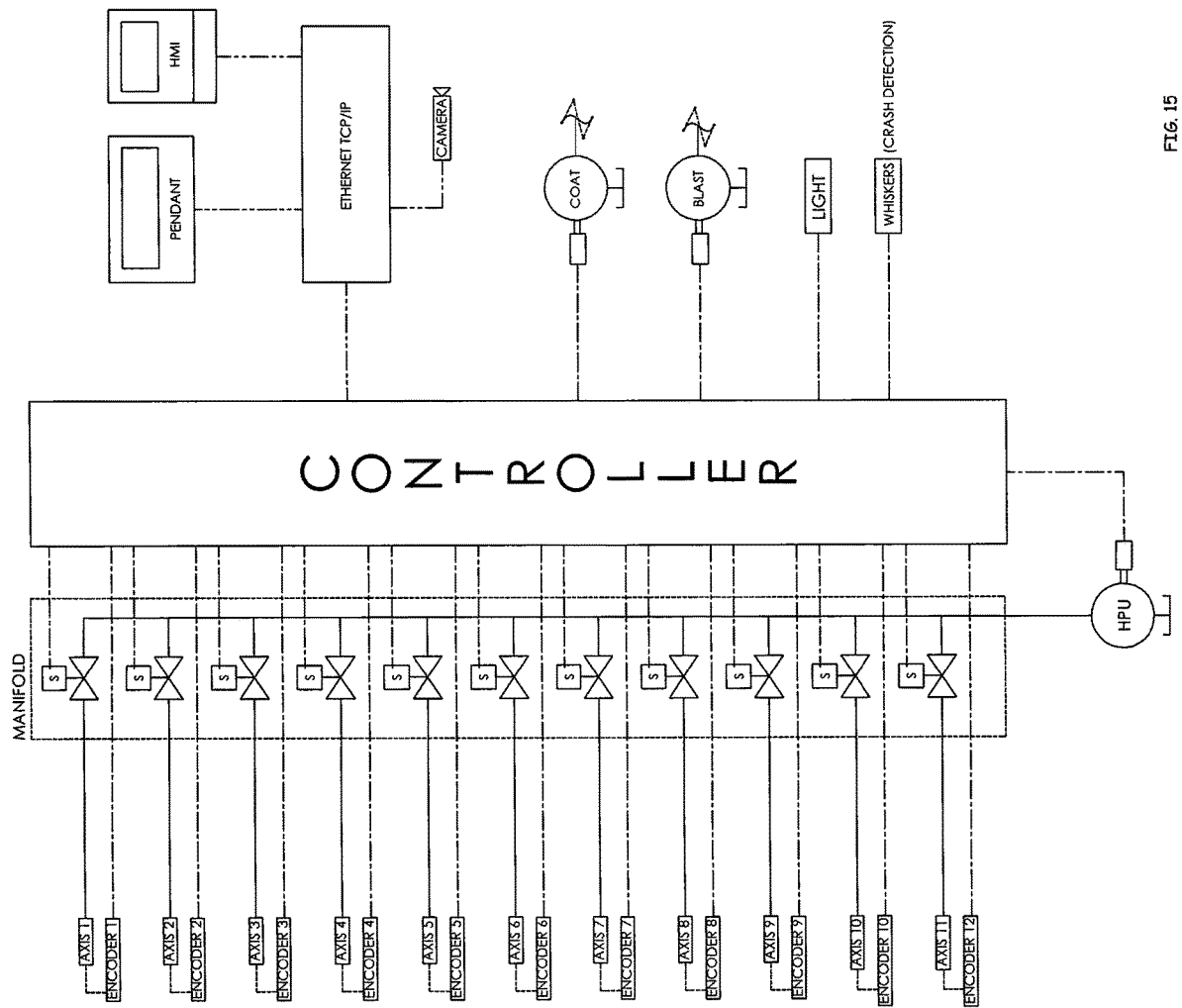
FIG. 15 illustrates a simplified block diagram for a preferred control system layout.

A preferred control layout in FIG. 15 shows 11 axes with closed loop control that is comprised of a hydraulic controller that receives commands from a control station to drive either a servo valve or proportional servo valve at each axis. The hydraulic power unit (HPU) provides a constant supply of hydraulic oil to valves on a manifold that in turn modulates the flow to corresponding actuators based on encoder feedback and toolpaths developed by software at the control station.

In certain embodiments, the controller can provide I/O (input and output) for interfacing with ancillary equipment such as lights, cameras, coating skid, media supply skid, or safety devices. Encoder feedback can be, but not be limited to, positional data sent to the motion controller through a serial interface for closed loop control of the hydraulic actuators. The media supply skid can include, but not be limited to, a pressure vessel connected to the nozzles through a transport hose. The motive force can be provided by compressed air ranging up to approximately 150 psi.

The safety equipment can include, but not be limited to, an e-stop button that is electrically connected to the control system that when depressed brings all motion to a safe and controlled stop.

The hydraulic power unit can include, but not be limited to, the requisite hydraulic pump driven by an electric motor to supply the system with flow and pressure of hydraulic fluid from an integrated storage reservoir. Supply and return hoses can connect between the hydraulic power unit and the hydraulic manifold.

Figure 7:
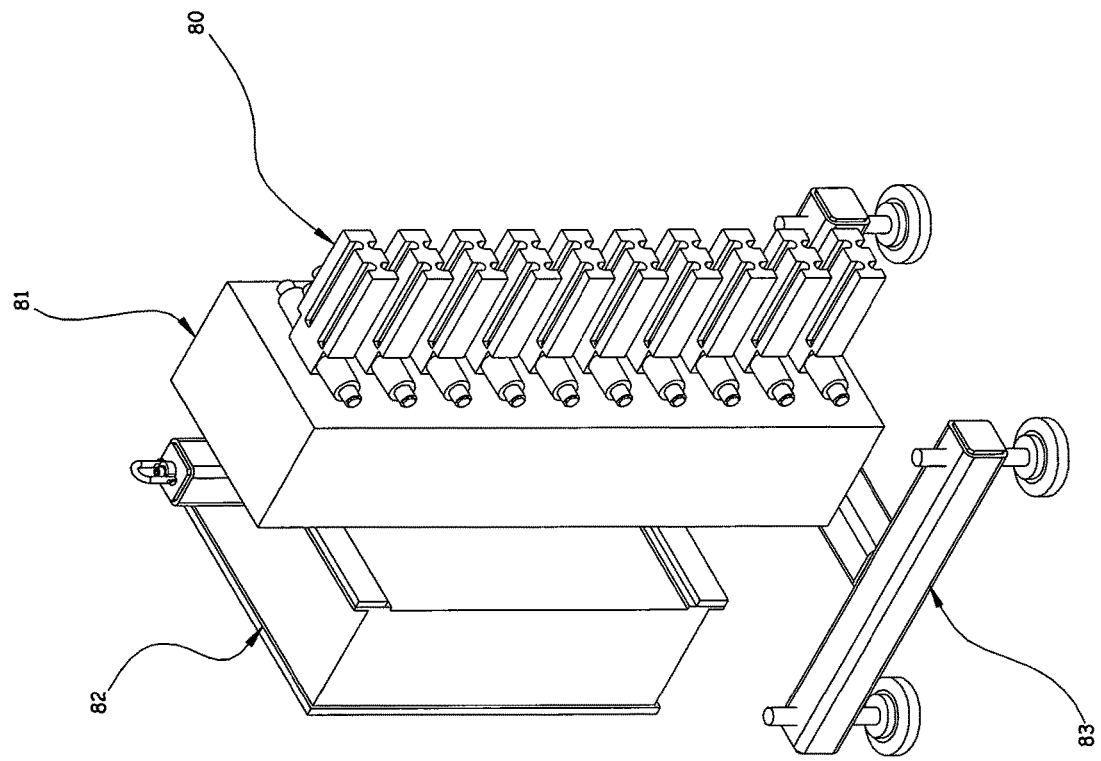
FIG. 7 is a perspective view of a hydraulic manifold with associated valves and controls in reference to the hydraulic control system used in the cleaning system of FIG. 1.

FIG. 7 is a perspective view of a hydraulic control system 2 used in the system of FIG. 1. The hydraulic control system can include a HPU and manifold block 81 populated with precision servo valves 80 used to control the articulating arm axis 50-61. Servo-proportional valves, solenoid valves, pressure relief valves, fittings, accumulator, a manifold block, gauges, filters, and any hydraulic circuit components required to control the articulating arm can also be mounted to the manifold. The manifold 81 and corresponding electrical panel 82 can be be mounted onto a common frame structure 83 and remotely located outside the classified hazardous area. In another embodiment, the electrical circuits can be be connected to intrinsically safe barriers and the electronic components will be rated for use in classified hazardous areas.

In another embodiment, the electrical panel 82 can be positively purged and monitored with a safety pressure switch interlocked into the control system. If the enclosure does not see adequate pressure, then the enclosure cannot be energized. Housed in the electrical panel 82, can be a motion controller that sends signals to the servo valves 80 in order to manipulate all axes 50-61.

A preferred embodiment can use a control signal that ranges from 0 to approximately 100 milliamps. In one embodiment, the signal could be +/−approximately 10 volts.

In another embodiment, the control signal can be transmitted over Ethernet, Profibus, DeviceNet, or any other network protocol or fieldbus communication protocol.

Referring to FIGS. 2B and 3, absolute encoders 100-110 can be mounted at each axis 50-61 provide positional feedback for closed loop control. For operation in classified hazardous areas, the preferred embodiment incorporates fiber optic encoders. In an alternative embodiment, encoders can be wired to isolation barriers for intrinsically safe operation.

The control station can include, but not limited to, a human machine interface (HMI) housed in a portable case 152 that rests on a detachable mobile stand 153.

Figure 8:
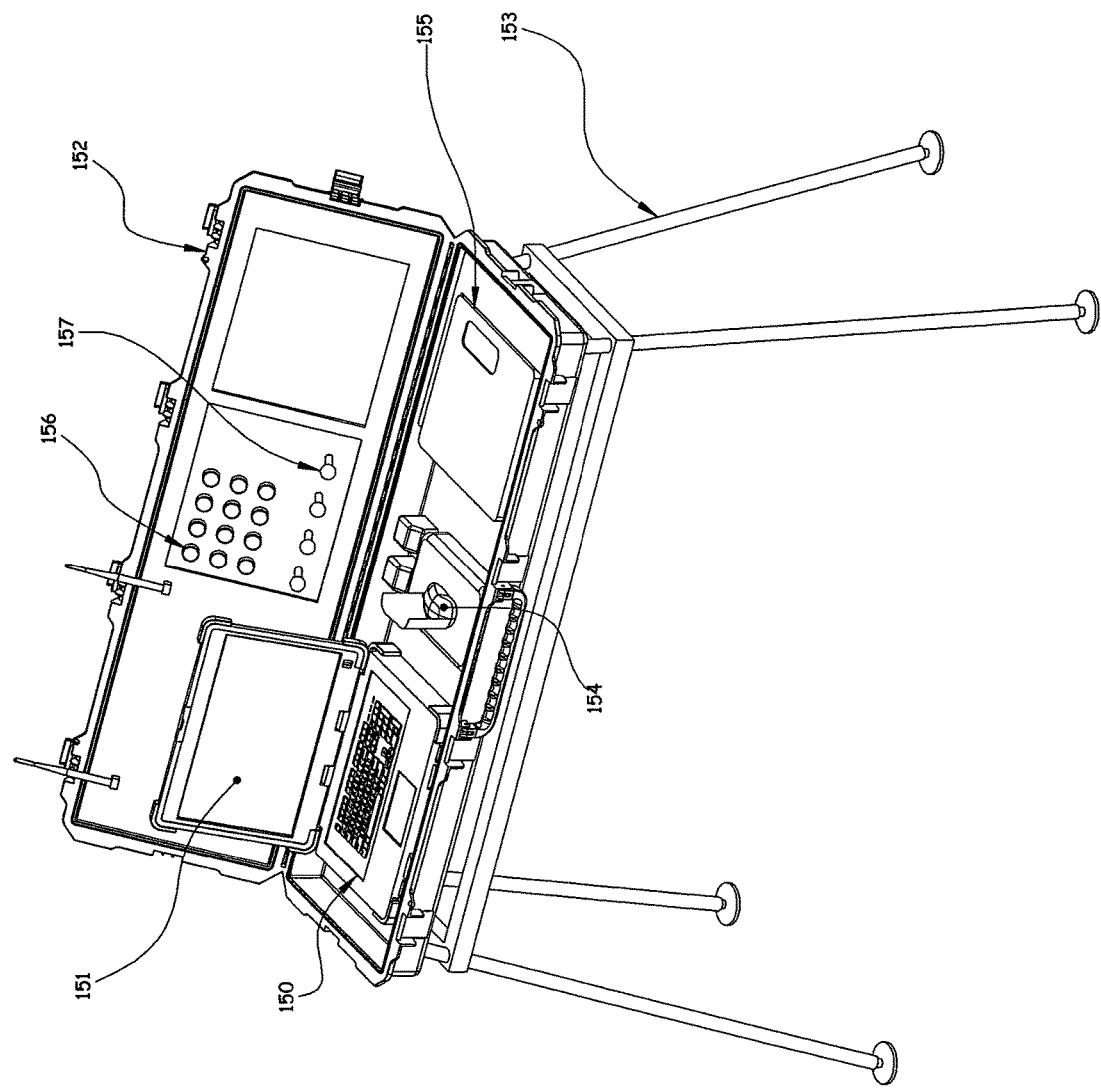
FIG. 8 is a perspective view of the human machine interface (HMI) used in the system of FIG. 1.

In reference to FIGS. 1 and 8, the portable human machine interface (HMI) 3 can be comprised of a user screen 151, keyboard 150, mouse 154, computer with central processing unit (CPU) 155, operating system, control software, pushbuttons 156, and joystick controllers 158. In one embodiment, multiple screens 151 are incorporated. In one embodiment, a real-time operating system can be used.

FIG. 9 represents a remote control comprised of a touchscreen 160, pushbuttons 162, and joystick controllers 163 all housed in a durable, hand held case 161. The remote control can be tethered to the control station 3 (FIG. 1) through a flexible electrical cable 164. In one embodiment, the remote control is wireless in which a local router is tethered to the control station through a flexible electrical cable.

Figure 10A:
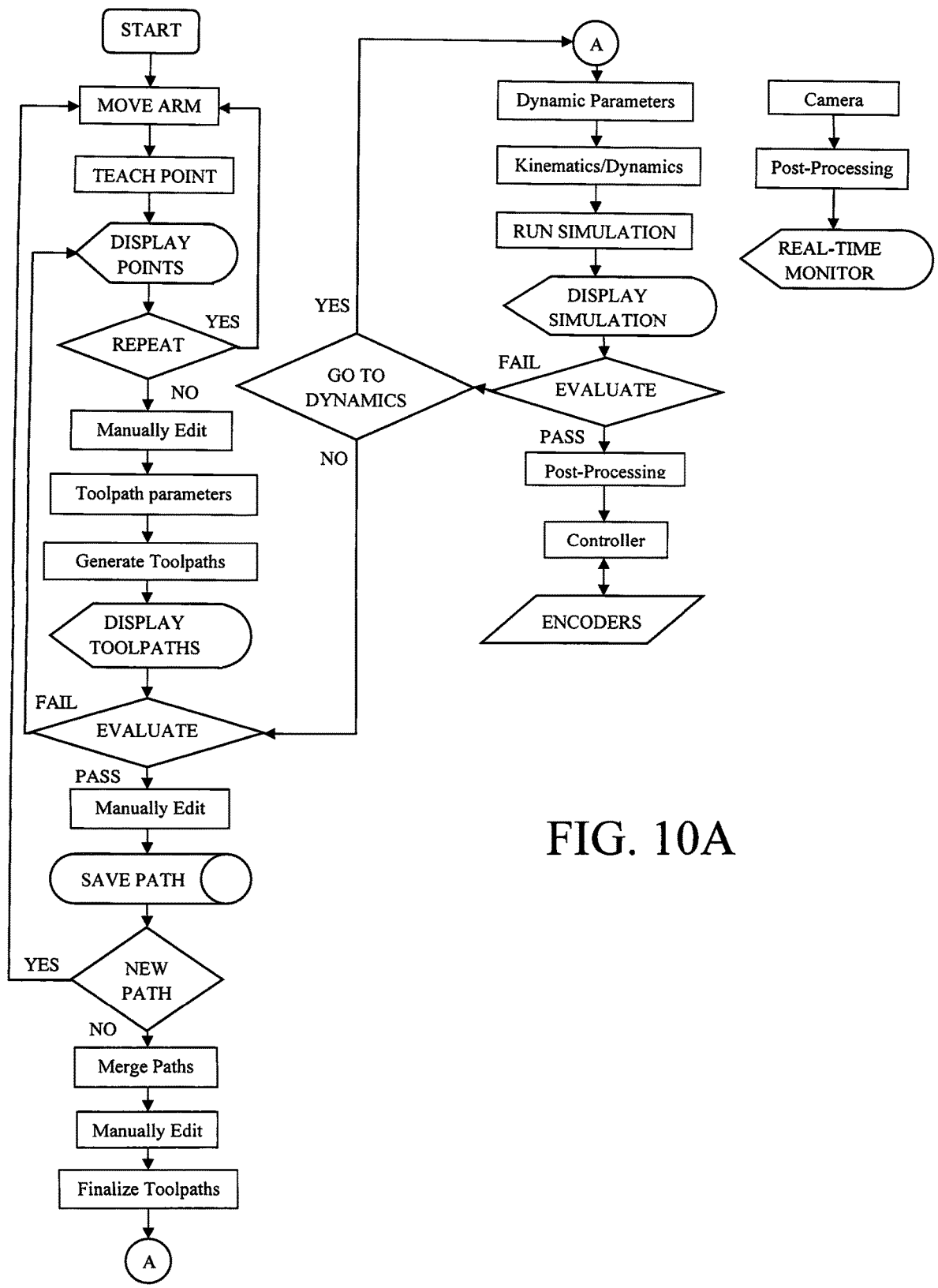
FIG. 10A illustrates the control program flowchart for the preferred embodiment.

The control software can include programs that compile positional data into toolpaths in order to output commands to a motion controller. FIG. 10A illustrates the preferred process flow of the control software. The operator starts the program and selects the number and type of axes being employed. The software configures the parameters accordingly and allows for user verification.

In one embodiment, the program automatically recognizes the articulating arm configuration with the corresponding number and type of axes. Next, coordinate points are manually selected and recorded as an operator manipulates the articulating arm. Repeating as many times as needed. At the user screen, these points can be viewed, edited and linked together to form a toolpath. This routine can be repeated until ended and multiple paths can be merged. Toolpaths can be saved for future use.

Once a tool path is finalized, dynamic parameters are entered. With this information, the kinematic algorithms determine the coordinates and angles from each axis to form a motion profile dictating the end effector's path. These profiles can be evaluated and edited at the HMI. The motion profiles are entered into a simulation model for evaluation. Once verified, the data is processed into information that can be interpreted by the motion controller.

Figure 10B:
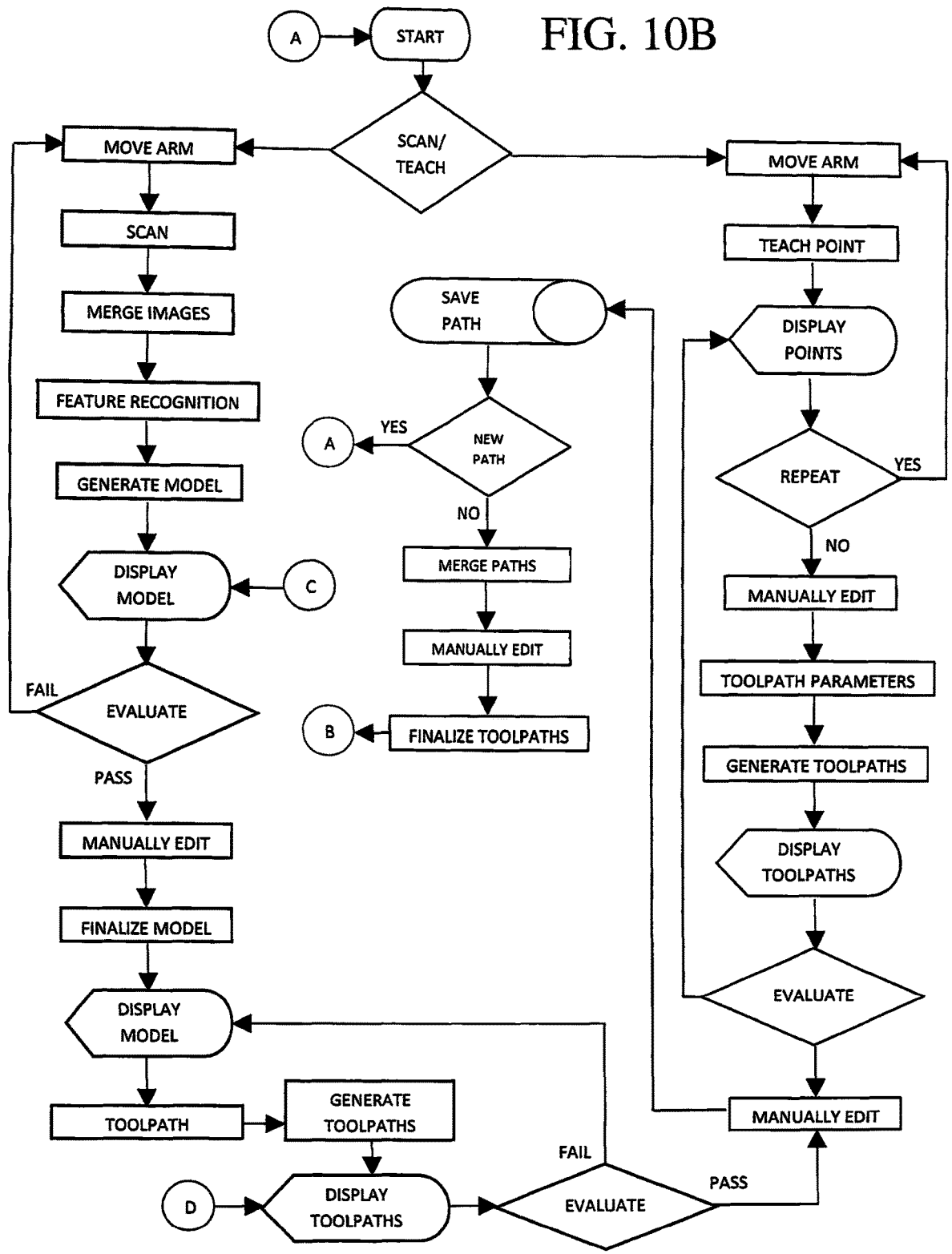
FIG. 10B and FIG. 10C illustrates the control program flowchart for the preferred embodiment.
Figure 10C:
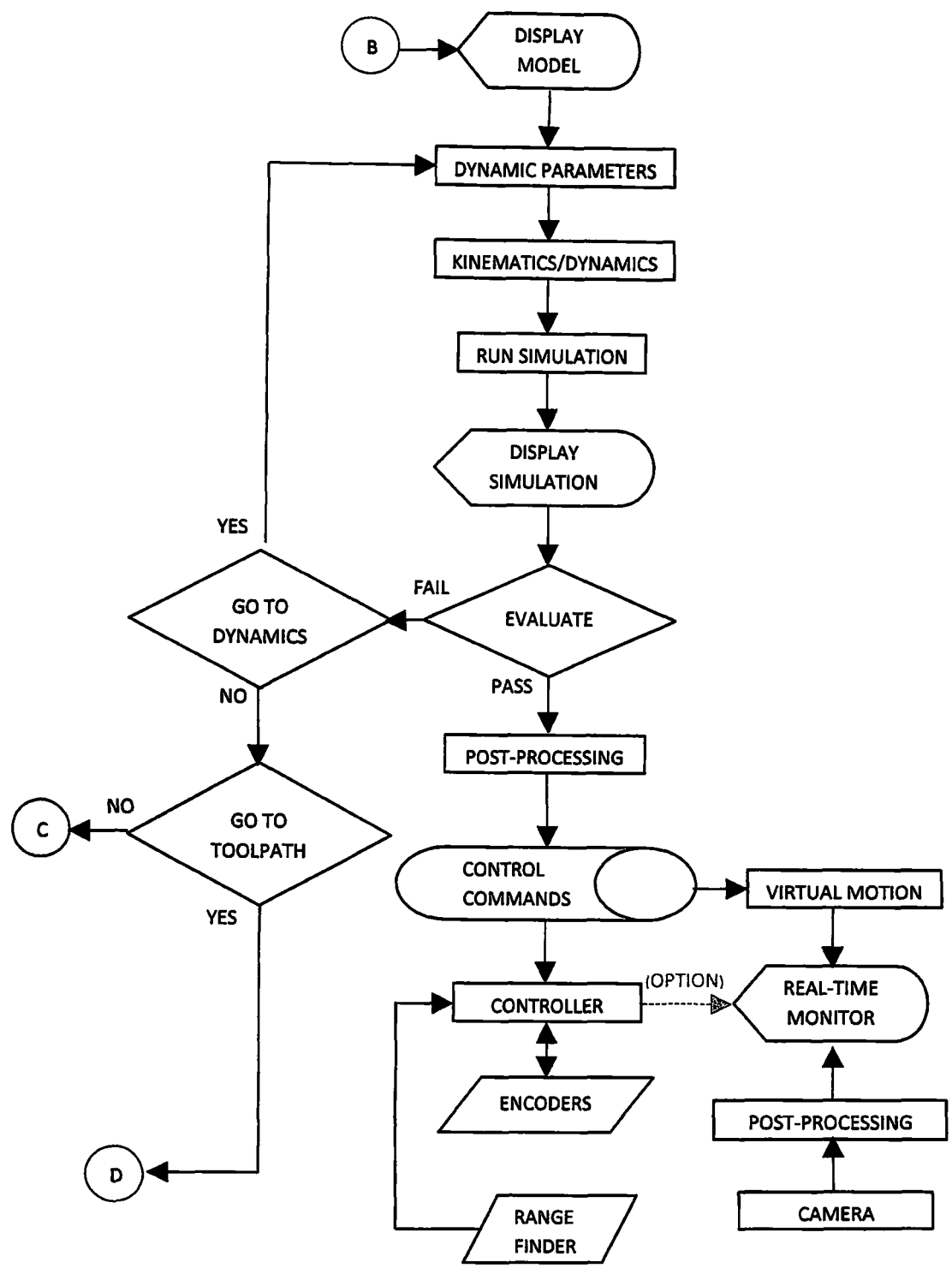

FIG. 10B shows an alternate process flow chart for one embodiment where an operator selects between manual teach mode or 3D scanning mode. Manual teach mode works as described above. Point cloud data is collected from 3D sensors and downloaded into the software. 3D rendering software analyzes this data and automatically recognizes standard features and populates that point cloud region with a 3D surface. The remaining data is rendered and meshed into the existing 3D surfaces. In conjunction with defined parameters, toolpaths can be generated from these 3D surfaces. This routine can be repeated until ended. Any path generated either automatically or manually can be merged. Toolpaths can be saved for future use.

Once a tool path is finalized, dynamic parameters are entered. With this information, the kinematic algorithms determine the composite coordinates and angles from each axis to form a motion profile dictating the end effector's path. These profiles can be evaluated and edited at the HMI. The motion profiles are entered into a simulation model for evaluation. Once verified, the data is processed into information that can be interpreted by the motion controller.

In certain embodiments, the software recognizes standard features and automatically determines appropriate toolpaths. In another embodiment, toolpaths are generated directly from point cloud data. In certain embodiments, the imaging software automatically recognizes standard features and determines toolpaths.

As shown in FIG. 11, anti-sway motion control can be implemented through an integrated speed vs. time curve into the program to prevent deflections and oscillations in the arm assembly. An instant after the articulating articulating arm 1 decelerates, and the velocity is equal to zero, there is a secondary acceleration so that speed immediately ramps up followed by a secondary deceleration such that the velocity goes back down to zero. The sensitivity of the anti-sway curve is configurable by the operator. In one embodiment, the software can calculate the required acceleration based on the velocity of the arm. In another embodiment, the acceleration will be determined through accelerometers, strain gauges, or any speed sensor capable of feeding back to the control system.

3D mapping can be accomplished through one or more imaging sensors utilizing ToF (time of flight), stereo vision, structured light, or any imaging technology that can be used to develop 3D point clouds.

In reference to FIGS. 1 and 6, The preferred embodiment can be equipped with the 3D imaging sensors 302 mounted on the distal end of the articulating arm articulating arm 1 such that an operator can maneuver the 3D imaging sensor 302 to an area in order to take a snapshot.

This can be done manually using the remote control or HMI computer interface. In one embodiment, the sensors can be handheld. In an alternate embodiment, the sensors can be mounted remotely with a portable mounting structure. In this embodiment, the sensor can be operated independently from the articulating arm allowing an operator to scan new areas while the articulating arm is cleaning and painting. This increases the efficiency by reducing the overall cycle time.

In another embodiment, sensors can be mounted on the distal end of the articulating arm and can be employed in conjunction with remote sensors. In certain embodiments, scanning can be done real-time as the camera travels through an area. The generated point cloud will show on the touchscreen or HMI. Multiple 3D images can be linked together without external, dedicated targets. The point cloud or mesh will be rendered by dedicated software into a 3D model.

Referring to FIG. 6, whisker style limit switches 301 can detect interferences between the articulating arm and another object. Once a crash is detected, a signal is sent to the controller to bring the arm- to a controlled stop. Whisker style limit switches 301 can be, but not limited to, a limit switch actuated by a rod protruding parallel axially to the articulating arm section at the distal end of the articulating arm assembly. A plurality of whisker style limit switches 301 can be mounted radially around the end effector for 360 degrees of detection.

Other embodiments can use ultrasonic, laser, infrared (IR), proximity, or 3D scanners.

The articulating arm assembly can be used for, but not limited to, cleaning, surface prepping, and coating any oil rig platform ballast tanks, void tanks, oil field tanks, ship ballast tanks, hazardous waste tanks, or large storage tank.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An articulating arm programmable tank cleaning nozzle system comprising:
   a plurality of manually adjustable leg assemblies, each of the leg assemblies comprising an upper leg beam, leg extension, adjustable foot extension, magnetic foot and leg quick release pins connected and arranged around a common base, the leg quick release pins for allowing each upper leg to be quickly assembled and disassembled from the common base;
   an articulating arm assembly attached to the leg assemblies, the arm assembly comprising a plurality of axes, arm sections, encoders, 6 bar linkages, bearings, and arm quick release pins, the arm quick release pins for allowing quick and simple disassembly and assembly for attaching each of the arm sections together;
   a nozzle attached to an end of a conduit, with the nozzle attached to a free end of the arm assembly,
   a cleaning substance supply attached to an opposite end of the conduit;
   a computer control system comprising a remote control and a control station, the computer control for operating disbursement of the cleaning substance through the conduit and nozzle, and to control movement of the articulating arm assembly; and
   a counterbalance for the articulating arm assembly comprised of a water filled, flexible bladder.

2. The articulating arm tank cleaning system of claim 1 wherein the articulating arm assembly is controlled by servo valves and servo-proportioning valves through hydraulic actuators for operation in hazardous explosive environments.

3. The articulating arm tank cleaning system of claim 1 further comprising:
   an inspection system which includes a camera housed in a protective case behind protective glass.

4. The articulating arm tank cleaning system of claim 1, further comprising:
   a distance measurement system comprising a laser sensor mounted at the distal end of the articulating arm.

5. The articulating arm tank cleaning system of claim 1, further comprising:
a thrust balancing system comprising a second nozzle mounted in an opposing direction to the nozzle being used for blasting.

6. The articulating arm tank cleaning system of claim 1 wherein the articulating arm assembly is modular, scalable and configurable to fit an environment.

7. The articulating arm tank cleaning system of claim 1 wherein the cleaning substance includes:
sponge blasting is used to clean tank surfaces, the sponge blasting includes at least one of: a sponge material impregnated with abrasive media and the sponge material without any abrasive media.

8. The articulating arm tank cleaning system of claim 1 wherein the cleaning substance includes: grit blasting is used to clean tank surfaces.

9. The articulating arm tank cleaning system of claim 1 wherein the cleaning substance includes: hydro blasting is used to clean tank surfaces.

10. The articulating arm tank cleaning system of claim 1 wherein the cleaning substance includes: dry ice blasting is used to clean tank surfaces.

11. The articulating arm tank cleaning system of claim 1 further comprising:
a paint supply so that the nozzle is used as a coating nozzle for the paint supply.

12. The articulating arm tank cleaning system of claim 1, wherein data from the encoder is transmitted over fiber optic cables for operation in classified hazardous environments.

13. An articulating arm programmable tank cleaning nozzle system comprising:
a plurality of manually adjustable leg assemblies, each of the leg assemblies comprising an upper leg beam, leg extension, adjustable foot extension, magnetic foot and leg quick release pins connected and arranged around a common base, the leg quick release pins for allowing each upper leg to be quickly assembled and disassembled from the common base;
an articulating arm assembly attached to the leg assemblies, the arm assembly comprising a plurality of axes, arm sections, encoders, 6 bar linkages, bearings, and arm quick release pins, the arm quick release pins for allowing quick and simple disassembly and assembly for attaching each of the arm sections together;
a nozzle attached to an end of a conduit, with the nozzle attached to a free end of the arm assembly,
a cleaning substance supply attached to an opposite end of the conduit;
a computer control system comprising a remote control and a control station, the computer control for operating disbursement of the cleaning substance through the conduit and nozzle, and to control movement of the articulating arm assembly; and
a plurality of crash detection whisker limit switches mounted radially around the end effector, the crash detection whisker limit switches for detecting interferences between the articulating arm assembly and other objects, and for sending a signal to the computer control system to stop movement of the articulating arm assembly.

14. The articulating arm tank cleaning system of claim 1 wherein the remote control is wireless and transmits data through a local router tethered to the control station through a flexible electrical cable.

15. The articulating arm tank cleaning system of claim 1 wherein the computer analyzes point cloud data to recognize standard geometry and then populate missing data to yield a complete feature profile.

16. The articulating arm tank cleaning system of claim 1, further comprising:
a 3D sensor that scans the area such that the computer renders point cloud data into 3D CAD models.

17. The articulating arm tank cleaning system of claim 1 wherein the computer automatically recognizes point cloud data as standard geometry and inserts 3D surfaces.

18. The articulating arm tank cleaning system of claim 1 wherein the computer automatically generates tool paths from 3D CAD models.

19. The articulating arm tank cleaning system of claim 1 wherein the computer automatically generates tool paths from point cloud data.

20. An articulating arm programmable tank cleaning nozzle system comprising:
a plurality of manually adjustable leg assemblies, each of the leg assemblies comprising an upper leg beam, leg extension, adjustable foot extension, magnetic foot and leg quick release pins connected and arranged around a common base, the leg quick release pins for allowing each upper leg to be quickly assembled and disassembled from the common base;
an articulating arm assembly attached to the leg assemblies, the arm assembly comprising a plurality of axes, arm sections, encoders, 6 bar linkages, bearings, and arm quick release pins, the arm quick release pins for allowing quick and simple disassembly and assembly for attaching each of the arm sections together;
a nozzle attached to an end of a conduit, with the nozzle attached to a free end of the arm assembly,
a cleaning substance supply attached to an opposite end of the conduit;
a computer control system comprising a remote control and a control station, the computer control for operating disbursement of the cleaning substance through the conduit and nozzle, and to control movement of the articulating arm assembly; and
a counter-balance filled with weights for the articulating arm assembly, the counter-balance being emptied of the filled weights to become lightweight when relocating the articulating arm assembly.

* * * * *